(12) United States Patent
Mulcahy et al.

(10) Patent No.: US 9,710,130 B2
(45) Date of Patent: Jul. 18, 2017

(54) USER FOCUS CONTROLLED DIRECTIONAL USER INPUT

(71) Applicant: Microsoft Technology Licensing, LLC, Redmond, WA (US)

(72) Inventors: Kathleen Mulcahy, Seattle, WA (US); Aaron Burns, Redmond, WA (US); Todd Omotani, Redmond, WA (US); Felicia Williams, Seattle, WA (US); Jeff Cole, Seattle, WA (US); Tim Psiaki, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 470 days.

(21) Appl. No.: 13/916,193

(22) Filed: Jun. 12, 2013

(65) Prior Publication Data

US 2014/0372944 A1   Dec. 18, 2014

(51) Int. Cl.
  *G06F 3/048* (2013.01)
  *G06F 3/0481* (2013.01)
  *G06F 3/01* (2006.01)
  *G06F 3/0482* (2013.01)
  *G06F 3/0487* (2013.01)

(52) U.S. Cl.
  CPC .......... *G06F 3/04815* (2013.01); *G06F 3/012* (2013.01); *G06F 3/013* (2013.01); *G06F 3/0482* (2013.01); *G06F 3/0487* (2013.01)

(58) Field of Classification Search
  CPC ........ G06F 3/013; G06F 3/041; G06F 3/0482; G06F 3/011; G06F 3/04815; G06F 3/04842; G06F 3/012; G06F 3/017; G06F 3/0346; G06F 3/0485; G06F 3/167; G06F 2203/0381; G06F 3/00; G06F 3/0304
  See application file for complete search history.

(56) References Cited

U.S. PATENT DOCUMENTS 6,009,210 A   12/1999   Kang
6,152,563 A   11/2000   Hutchinson et al.
(Continued)

OTHER PUBLICATIONS

Response to International Search Report & The Written Opinion dated Nov. 28, 2014, International Application No. PCT/US2014/041121.

Fu, et al., "hMouse: Head Tracking Driven Virtual Computer Mouse", In Proceedings of the IEEE Workshop on Applications of Computer Vision, Feb. 2007, 6 pages.
(Continued)

*Primary Examiner* — Di Xiao
(74) *Attorney, Agent, or Firm* — Vierra Magen Marcus LLP

(57) ABSTRACT

A user input for a near-eye, see-through display device is disclosed. Hands-free user input in an augmented reality environment is provided for. A user can provide input by moving the orientation of their head. For example, the user could rotate their head. In one aspect, a user can provide input by moving their eye gaze along a direction. In one aspect, when the user directs their attention at a user interface symbol, a handle extends away from the user interface symbol. The handle may serve as a type of selection device such that if the user directs their attention along the handle, away from the user interface symbol, a selection can be made. "As one example, the selection causes a spoke menu to appear which the user can select by rotating their head such that the system determines the user is looking along the spoke away from a central hub.

17 Claims, 19 Drawing Sheets

(56) References Cited

U.S. PATENT DOCUMENTS

| | | |
|---|---|---|
| 6,307,526 B1 | 10/2001 | Mann |
| 7,121,946 B2 | 10/2006 | Paul et al. |
| 7,412,077 B2 | 8/2008 | Li et al. |
| 7,883,415 B2 | 2/2011 | Larsen et al. |
| 8,910,078 B2 * | 12/2014 | Sweeney ............... G06F 3/0481 715/800 |
| 9,035,878 B1 * | 5/2015 | Wheeler ....................... 345/157 |
| 2010/0083172 A1 * | 4/2010 | Breeds ................. G06F 3/0482 715/810 |
| 2011/0004849 A1 * | 1/2011 | Oh ................................ 715/816 |
| 2011/0078560 A1 * | 3/2011 | Weeldreyer ........... G06F 17/214 715/255 |
| 2011/0140994 A1 * | 6/2011 | Noma ............................... 345/8 |
| 2012/0154557 A1 | 6/2012 | Perez et al. |
| 2012/0306725 A1 | 12/2012 | Hilkes |
| 2013/0007668 A1 | 1/2013 | Liu et al. |
| 2013/0073932 A1 * | 3/2013 | Migos et al. ................. 715/201 |
| 2013/0135353 A1 | 5/2013 | Wheeler et al. |
| 2015/0070477 A1 * | 3/2015 | Taki .................. H04N 13/0022 348/56 |

OTHER PUBLICATIONS

Zhu, et al., "Eye and Gaze Tracking for Interactive Graphic Display", In Journal of Machine Vision and Applications, vol. 15, Issue 3, Jun. 8, 2004, 10 pages.

Thomas, et al., "Glove Based User Interaction Techniques for Augmented Reality in an Outdoor Environment", In Journal of Virtual Reality: Research, Development, and Applications, vol. 6, Issue 3, Oct. 2002, 14 pages.

Ebisawa, et al., "PupilMouse: Cursor Control by Head Rotation Using Pupil Detection Technique", In 2nd International Conference on Computing, Communication and Control Technologies, Aug. 14, 2004, 6 pages.

"International Search Report & Written Opinion for PCT Patent Application No. PCT/US2014/041121", Mailed Date: Aug. 14, 2014, Filed Date: Jun. 5, 2014, 8 Pages.

"International Preliminary Report on Patentability Issued in PCT Application No. PCT/US2014/041121", Mailed Date: Aug. 31, 2015, 7 Pages.

Examination Report dated May 11, 2017, Eurpoean Patent Application No. 14733485.8-1879.

* cited by examiner

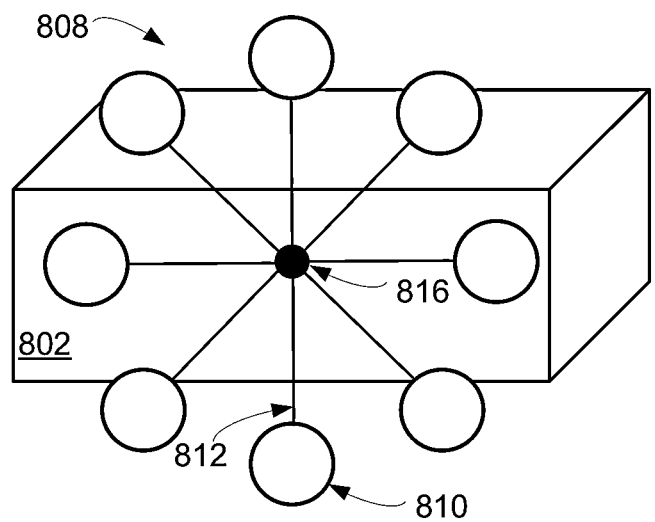
FIG. 8D
FIG. 9A
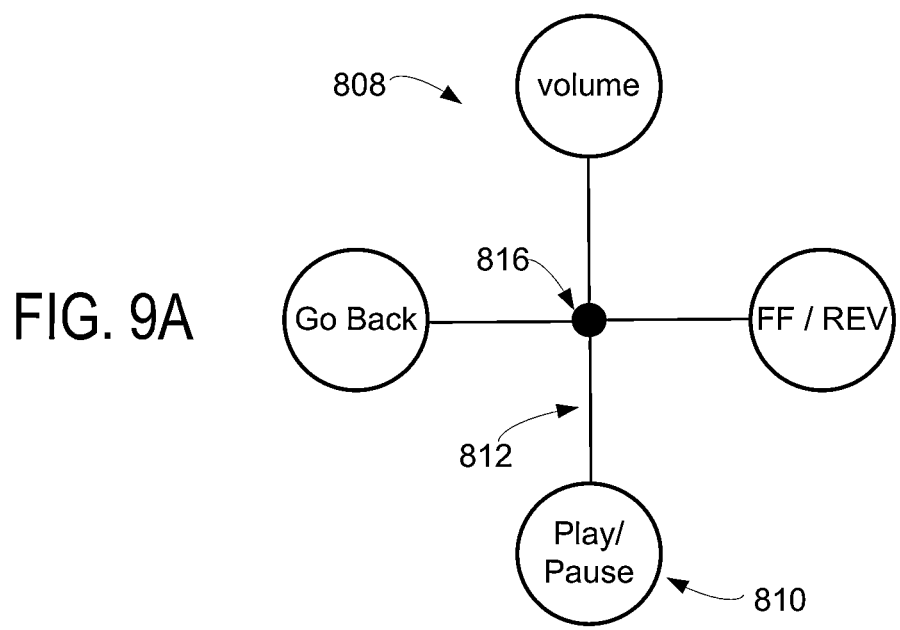

USER FOCUS CONTROLLED DIRECTIONAL USER INPUT

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. An AR implementation may be used to enhance numerous applications including video game, mapping, navigation, and mobile device applications.

A near-eye display such as a head mounted display (HMD) may be worn by a user to view the mixed imagery of virtual and real objects. A near-eye display uses a combination of optics and stereopsis to focus virtual imagery in the user's field of view.

Accessing system menus in an augmented-reality environment in a hands-free way is non-trivial. Voice has the disadvantage of feeling unnatural, creating awkward social situations where people are speaking commands in public, and with current technology does not always correctly interpret the command on the first try. Mouse and glove-type controllers have the disadvantage of requiring extra hardware and cannot be easily used while one's hands are occupied (e.g. carrying things, eating. etc.).

SUMMARY

A system and method are provided that provide a user interface in a see-through, near-eye display, such as an HMD. The user interface is controlled by head orientation, in one embodiment. Eye gaze could also be used.

According to one embodiment, a method comprising the following is provided. A user interface symbol is presented in a see-through, near-eye display. Focus of a user that is wearing the see-through, near-eye display is determined. A handle is presented in the see-through, near-eye display that extends away from the user interface symbol in response to determining that the user is focused on the user interface symbol. A determination is made that the user's focus has shifted along the handle away from the user interface symbol. A user interface element is activated in response to determining that the user's focus has shifted away from the user interface symbol along the handle to meet a selection criterion.

One embodiment includes a display system comprising a see-through, near-eye display device and logic in communication with the display device. The logic is configured to present a user interface symbol in the see-through, near-eye display device. The logic is configured to track eye gaze or head orientation of a user wearing the see-through, near-eye display device. The logic is configured to display a handle in the see-through, near-eye display device that extends away from the user interface symbol in response to determining that either the eye gaze or the head orientation indicates that the user is looking at the user interface symbol. The logic is configured to activate a user interface element in response to determining that the eye gaze or head orientation indicates that the user is looking away from the user interface symbol along the handle to meet a selection criterion.

One embodiment includes a method of providing a user interface in a see-through, near-eye display device. The method comprising the following. A user interface symbol is presented in the see-through, near-eye display device. Head orientation of a user wearing the see-through, near-eye display device is tracked. A handle that extends away from the user interface symbol is presented in the see-through, near-eye display device in response to determining, based on the head orientation, that the user is looking in the general direction of the user interface symbol. A spoke menu is spawned in the see-through, near-eye display device in response to determining that the user's head orientation indicates that the user has shifted from looking at the user interface symbol along the handle. The spoke menu includes menu items around a central hub, with each of the menu items having a spoke between it and the central hub.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 8D is an example of one embodiment of a spokes menu.

FIGS. 9A, 9B, and 9C show an example of one embodiment of a spokes menu.

DETAILED DESCRIPTION

Technology is disclosed herein by which a user's experience when using a near-eye, see-through display device is enhanced. Hands-free user input in an augmented reality environment is provided for, in accordance with one embodiment. Access to system menus is provided for, in accordance with one embodiment. In one embodiment, a user can provide input by moving the orientation of their head. For example, the user could rotate their head. In one embodiment, a user can provide input by moving a direction of their eye gaze.

In one embodiment, a user interface symbol is presented in the near eye display device. The user interface symbol could be presented such that it appears to be on or near a real-world object or on or near a virtual object being rendered in the near eye display device. The user interface symbol may serve as an indicator to the user that the user has a chance to enter input to somehow interact with the object. If the user directs their attention at the user interface symbol, a handle extends away from the user interface symbol, in one embodiment. The system could determine that the user has focused their attention at the user interface symbol by determining the user's head orientation and/or their eye gaze. The user interface symbol may also be referred to as a "gleam," as it can, in some embodiments, be made to gleam, glow, etc. in response to the user looking at it.

The handle may serve as a type of selection device such that if the user directs their attention along the handle, away from the user interface symbol, a selection can be made. As one example, the user can cause a menu to appear by rotating their head such that system determines the user is looking along the handle away from the user interface symbol. In one embodiment, this is a spoke menu that has menu items surrounding a hub. The last point at which the user was looking to activate the spoke menu may serve as a hub for the spoke menu. The user can then select the menu items by directing their focus to one of the menu items. In one embodiment, the user moves their head towards a menu item to select it. For example, the user might rotate their head left, right, up, or down to select the menu item. In one embodiment, the user moves their eyes towards a menu item as part of a selection process.

Figure 1:
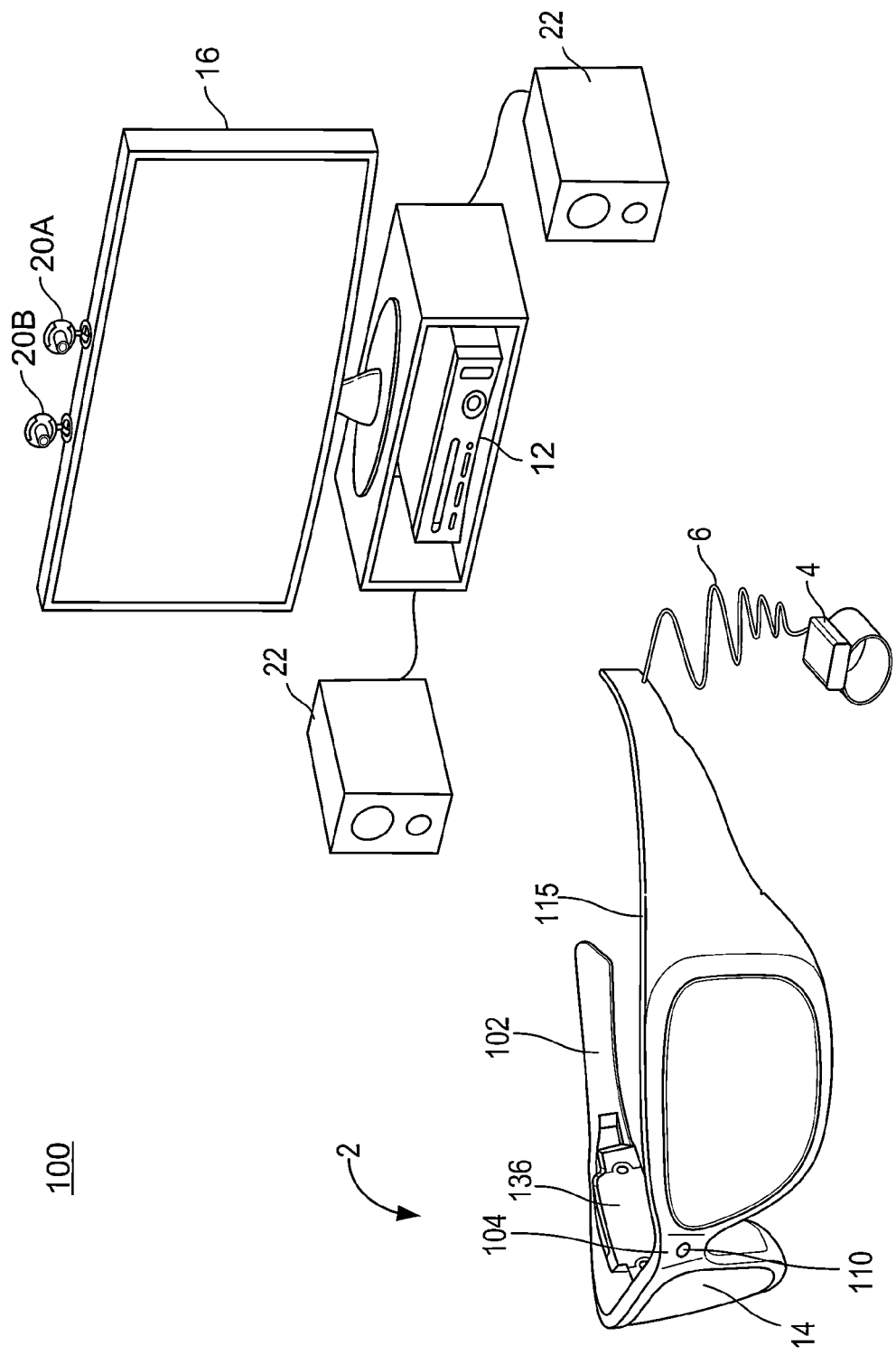
FIG. 1 is a block diagram depicting example components of one embodiment of a see-through, mixed reality display device in a system environment in which the device may operate.

FIG. 1 is a block diagram depicting example components of one embodiment of a see-through, mixed reality display device 2 in a system environment 100 in which the device may operate. The see-through display device is a near-eye, head mounted display device 2 in communication with processing unit 4 via wire 6. In other embodiments, head mounted display device 2 communicates with processing unit 4 via wireless communication. Processing unit 4 may take various embodiments. In some embodiments, processing unit 4 is a separate unit which may be worn on the user's body, e.g., the wrist in the illustrated example or in a pocket, and includes much of the computing power used to operate near-eye display device 2. Processing unit 4 may communicate wirelessly (e.g., WiFi, Bluetooth, infra-red, or other wireless communication means) to one or more hub computing systems 12, hot spots, cellular data networks, etc. In other embodiments, the functionality of the processing unit 4 may be integrated in software and hardware components of the display device 2.

See through head mounted display device 2, which in one embodiment is in the shape of eyeglasses in a frame 115, is worn on the head of a user so that the user can see through a display, embodied in this example as a display optical system 14 for each eye, and thereby have an actual direct view of the space in front of the user. The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Based on the context of executing software, for example, a gaming application, the system can project images of virtual objects, sometimes referred to as virtual images, on the display that are viewable by the person wearing the see-through display device while that person is also viewing real world objects through the display.

Frame 115 provides a support for holding elements of the HMD 2 in place as well as a conduit for electrical connections. In this embodiment, frame 115 provides a convenient eyeglass frame as support for the elements of the system discussed further below. In other embodiments, other support structures can be used. An example of such a structure is a visor, hat, helmet or goggles. The frame 115 includes a temple or side arm for resting on each of a user's ears. Temple 102 is representative of an embodiment of the right temple and includes control circuitry 136 for the display device 2. Nose bridge 104 of the frame includes a microphone 110 for recording sounds and transmitting audio data to processing unit 4.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. An application may be executing on hub computing system 12, the display device 2, as discussed below on a mobile device 5 or a combination of these.

In one embodiment, the hub computing system 12 further includes one or more capture devices, such as capture devices 20A and 20B. The two capture devices can be used to capture the room or other physical environment of the user but are not necessary for use with see through head mounted display device 2 in all embodiments.

Capture devices 20A and 20B may be, for example, cameras that visually monitor one or more users and the surrounding space such that gestures and/or movements performed by the one or more users, as well as the structure of the surrounding space, may be captured, analyzed, and tracked to perform one or more controls or actions within an application and/or animate an avatar or on-screen character.

Hub computing system 12 may be connected to an audiovisual device 16 such as a television, a monitor, a high-definition television (HDTV), or the like that may provide game or application visuals. In some instances, the audiovisual device 16 may be a three-dimensional display device. In one example, audiovisual device 16 includes internal speakers. In other embodiments, audiovisual device 16, a separate stereo or hub computing system 12 is connected to external speakers 22.

Note that HMD 2 and processing unit 4 can be used without hub computing system 12, in which case processing unit 4 will communicate with a WiFi network, a cellular network or other communication means.

In various embodiments, the processes described herein are performed in whole or in part by head mounted display device 2, processing unit 4, hub computing system 12, or a combination thereof.

In one example implementation, various sensor technologies embedded in head mounted display device 2 including inertial sensing using inertial measurements from accelerometers and gyroscopes, global positioning system (GPS), eye tracking elements determine a focus of the user. By focus, it is meant where the user is looking or what has the user's attention. The user's focus can be determined by head orientation and/or eye gaze. In some cases, the head orientation and eye gaze are focused at different points. For example, the user might not be looking straight ahead. In such as case, head orientation may be used to define the focus. Alternatively, the eye gaze could be used to determine the user's focus when the two differ.

Other techniques and sensors may be used to determine the user's focus. These could include time of flight, spatial scan, mechanical linkages, phase-difference sensing, and/or direct field sensing. In such cases, additional hardware may be needed in the head mounted display. More details of head mounted display device 2 and processing unit 4 will be described below with respect to FIGS. 3, 4A and 4B.

In one embodiment, hub computing device 12 may be used to track the user and head mounted display device 2 to provide a preliminary determination of location and orientation of head mounted display device 2. Various sensor technologies may be implemented in hub computing device 12 including RGB camera, depth sensor, and/or other technologies to determine location and orientation of head mounted display device 2. More details of hub computing device 12 will be described below with respect to FIG. 5.

Additional information such as information retrieved from the cloud, information detected and/or gathered by one or more external devices, and other relevant information may also be used to identify and continuously track the user's head position and rotation. Techniques such as Simultaneous Localization and Mapping (SLAM) using RGB and/or depth sensor data may be employed to provide a real-time position of the user's head relative to the mapped environment. Environmental typography may be identified using data from the cloud and/or depth sensor data. Regions of the user's body can be identified (e.g., hand, arm, torso, legs) using the depth sensor when the user is looking at him or herself.

It should be recognized that not all sensor information and/or sensing technologies as discussed above are required at all times. One or more sensors may be used as redundancies to further refine the measurement of the total field of view of the user.

Figure 2:
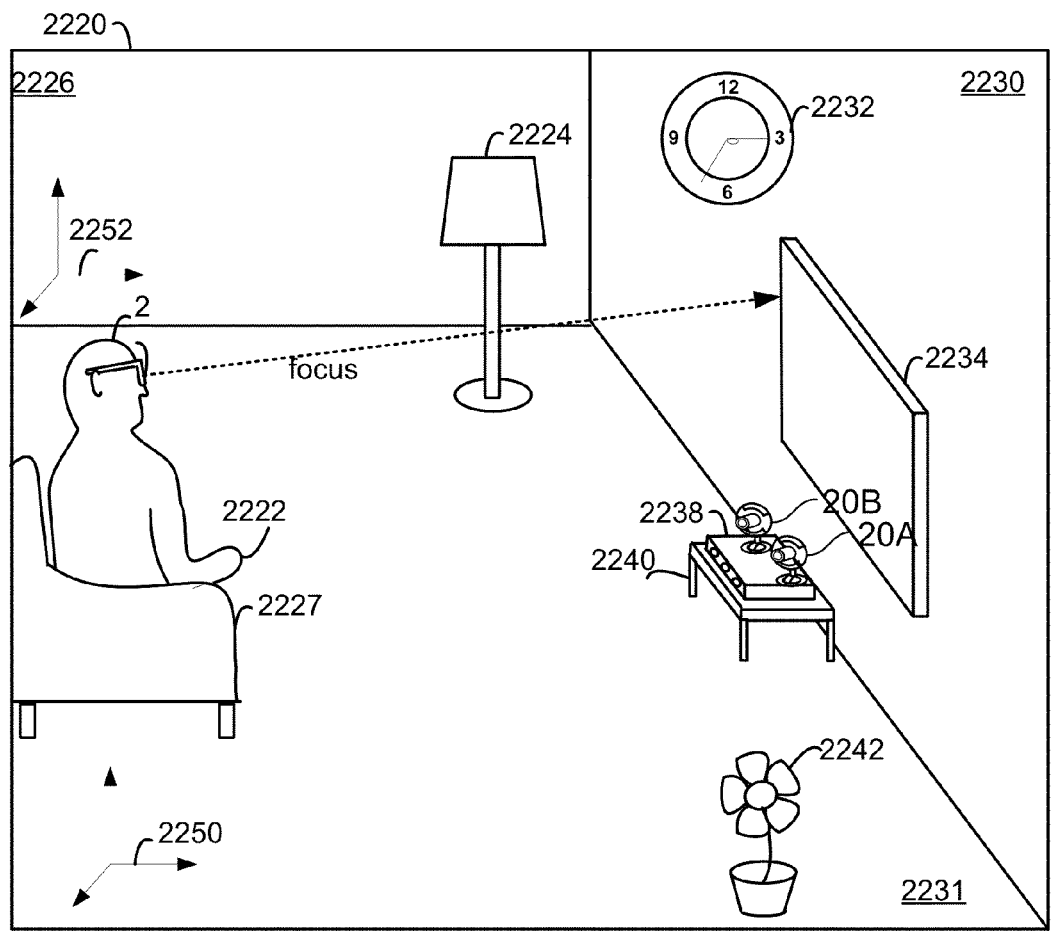
FIG. 2 illustrates a user wearing head mounted display device in an environment.

FIG. 2 illustrates a user 2222 wearing head mounted display device 2 in an environment 2220. In this example, the user's head position and orientation are continuously tracked. Optionally, the user's eye gaze may also be tracked. For example, at a given instant of time such as time user's 2222 head position and orientation are identified using the various sensor technologies as described above, and user 2222 is shown with their focus directed towards element 2234, which may be a picture, television screen, etc. The user's focus could be defined as a vector that originates at a point between the eyes and "shoots straight out."

The user's focus could also be defined using eye tracking. In this case, technology in the HMD 2, or elsewhere, can track the direction in which one or both of the user's eyes are gazing. Typically, eye gaze is considered to be a point at which the user's eyes are momentarily fixed.

The environment includes a lamp 2224, clock 2232, a portion of wall 2230, a portion of wall 2226, a table 2240, processing device 2238, capture devices 20A, 20B, and display 2234, floor 2231, and a flower 2242. The environment 2220 may be defined relative to a coordinate system 2250, and the user's head position and orientation defined relative to a second coordinate system 2252.

By identifying and continuously tracking the user's head position and orientation relative to environment 2220 at various time instances, the direction of focus can be ascertained. Also, eye tracking can be used instead, or in addition to head tracking, to ascertain the direction of focus.

Figure 3:
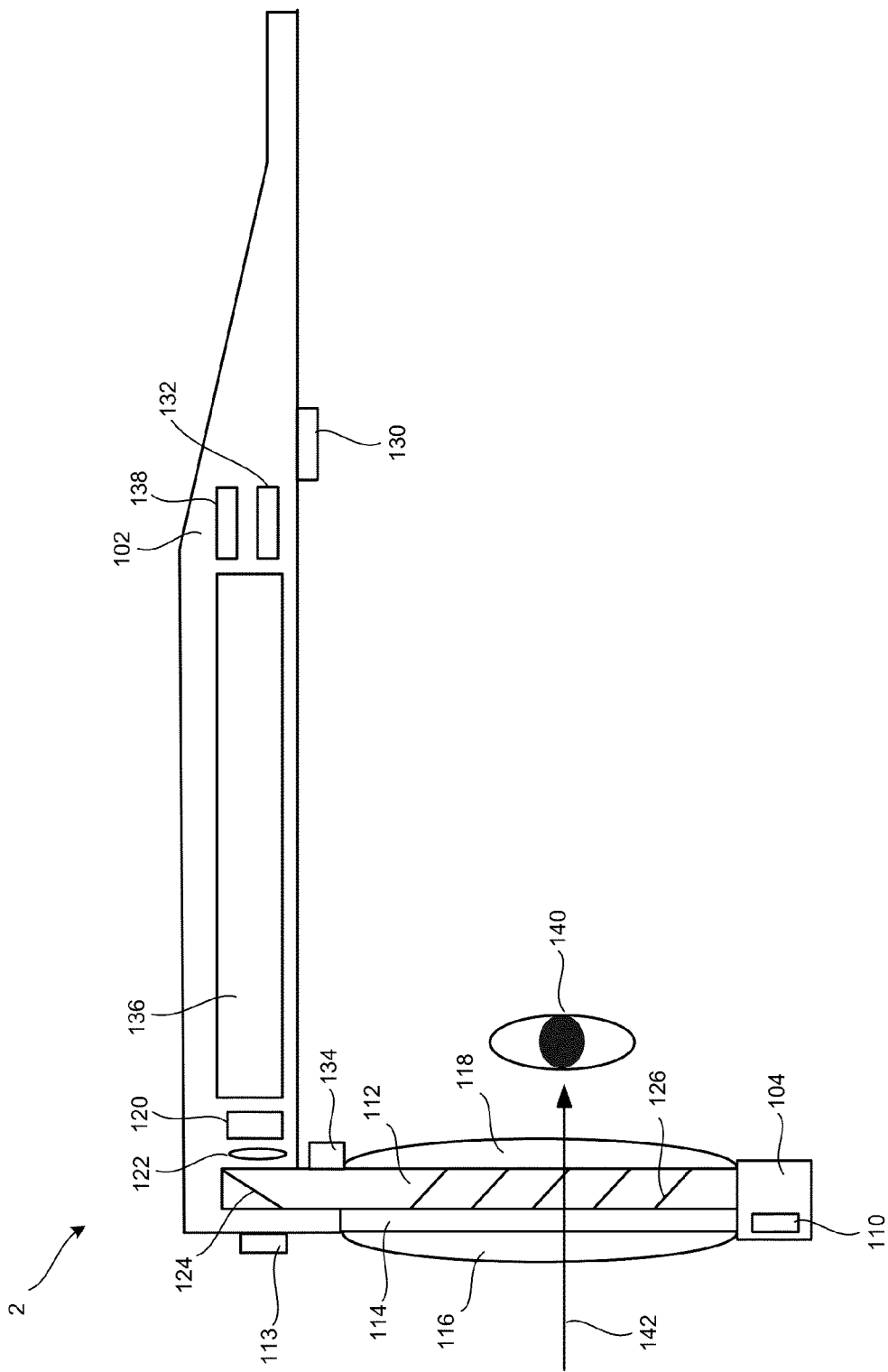
FIG. 3 is a top view of a portion of one embodiment of a head mounted display unit.

FIG. 3 depicts a top view of a portion of head mounted display device 2, including a portion of the frame that includes temple 102 and nose bridge 104. Only the right side of head mounted display device 2 is depicted. At the front of head mounted display device 2 is a physical environment facing camera 113 that can capture video and still images. Those images are transmitted to processing unit 4, as described below.

In one embodiment, physical environment facing camera 113 is a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera. For example, the depth camera may include an IR illuminator transmitter and a hot reflecting surface like a hot mirror in front of the visible image sensor which lets the visible light pass and directs reflected IR radiation within a wavelength range transmitted by the illuminator to a CCD or other type of depth sensor. The data from the sensors may be sent to the processing unit 4 or hub computing system 12 for processing. The processing identifies and maps the user's real world field of view. Additionally, physical environment facing camera 113 may also include a light meter for measuring ambient light.

A portion of the frame of head mounted display device 2 will surround a display (that includes one or more lenses). In order to show the components of head mounted display device 2, a portion of the frame surrounding the display is not depicted. The display includes a light guide optical element 112, opacity filter 114, see-through lens 116 and see-through lens 118. In one embodiment, opacity filter 114 is behind and aligned with see-through lens 116, light-guide optical element 112 is behind and aligned with opacity filter 114, and see-through lens 118 is behind and aligned with light-guide optical element 112. See-through lenses 116 and 118 are standard lenses used in eye glasses and can be made to any prescription (including no prescription). In one embodiment, see-through lenses 116 and 118 can be replaced by a variable prescription lens. In some embodiments, head mounted display device 2 will include only one see-through lens or no see-through lenses. In another alternative, a prescription lens can go inside light guide optical element 112. Opacity filter 114 filters out natural light (either on a per pixel basis or uniformly) to enhance the contrast of the virtual imagery. Light guide optical element 112 channels artificial light to the eye. More details of the opacity filter 114 and light guide optical element 112 is provided below.

Mounted to or inside temple 102 is an image source, which (in one embodiment) includes micro display assembly 120 for projecting a virtual image and lens 122 for directing images from micro display 120 into light guide optical element 112. In one embodiment, lens 122 is a collimating lens.

Control circuits 136 provide various electronics that support the other components of head mounted display device 2. More details of control circuits 136 are provided below with respect to FIGS. 4A and 4B. Inside, or mounted to temple 102, are ear phones 130, inertial and/or magnetic sensors 132 and temperature sensor 138. In one embodiment inertial and magnetic sensors 132 include a three axis magnetometer 132A, three axis gyro 132B and three axis accelerometer 132C (See FIG. 4A). The inertial and/or magnetic sensors are for sensing position, orientation, and sudden accelerations of head mounted display device 2.

Micro display 120 projects an image through lens 122. There are different image generation technologies that can be used to implement micro display 120. For example, micro display 120 can be implemented in using a transmissive projection technology where the light source is modulated by optically active material, backlit with white light. These technologies are usually implemented using LCD type displays with powerful backlights and high optical energy densities. Micro display 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the system described herein. Additionally, micro display 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light guide optical element 112 transmits light from micro display 120 to the eye 140 of the user wearing head mounted display device 2. Light guide optical element 112 also allows light from in front of the head mounted display device 2 to be transmitted through light guide optical element 112 to eye 140, as depicted by arrow 142, thereby allowing the user to have an actual direct view of the space in front of head mounted display device 2 in addition to receiving a virtual image from micro display 120. Thus, the walls of light guide optical element 112 are see-through. Light guide optical element 112 includes a first reflecting surface 124 (e.g., a mirror or other surface). Light from micro display 120 passes through lens 122 and becomes incident on reflecting surface 124. The reflecting surface 124 reflects the incident light from the micro display 120 such that light is trapped inside a planar, substrate comprising light guide optical element 112 by internal reflection. After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye 140 of the user. As different light rays will travel and bounce off the inside of the substrate at different angles, the different rays will hit the various reflecting surface 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a light guide optical element can be found in United States Patent Application Publication 2008/0285140, Ser. No. 12/214, 366, published on Nov. 20, 2008, "Substrate-Guided Optical Devices" incorporated herein by reference in its entirety. In one embodiment, each eye will have its own light guide optical element 112. When the head mounted display device has two light guide optical elements, each eye can have its own micro display 120 that can display the same image in both eyes or different images in the two eyes. In another embodiment, there can be one light guide optical element which reflects light into both eyes.

Opacity filter 114, which is aligned with light guide optical element 112, selectively blocks natural light, either uniformly or on a per-pixel basis, from passing through light guide optical element 112. In one embodiment, the opacity filter can be a see-through LCD panel, electro chromic film, PDLC (Polymer dispersed Liquid Crystal) or similar device which is capable of serving as an opacity filter. Such a see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

Opacity filter 114 can include a dense grid of pixels, where the light transmissivity of each pixel is individually controllable between minimum and maximum transmissivities. While a transmissivity range of 0-100% is ideal, more limited ranges are also acceptable. As an example, a monochrome LCD panel with no more than two polarizing filters is sufficient to provide an opacity range of about 50% to 99% per pixel, up to the resolution of the LCD. At the minimum of 50%, the lens will have a slightly tinted appearance, which is tolerable. 100% transmissivity represents a perfectly clear lens. An "alpha" scale can be defined from 0-100%, where 0% allows no light to pass and 100% allows all light to pass. The value of alpha can be set for each pixel by the opacity filter control circuit 224 described below.

A mask of alpha values can be used from a rendering pipeline, after z-buffering with proxies for real-world objects. When the system renders a scene for the augmented reality display, it takes note of which real-world objects are in front of which virtual objects. If a virtual object is in front of a real-world object, then the opacity should be on for the coverage area of the virtual object. If the virtual is (virtually) behind a real-world object, then the opacity should be off, as well as any color for that pixel, so the user will only see the real-world object for that corresponding area (a pixel or more in size) of real light. Coverage would be on a pixel-by-pixel basis, so the system could handle the case of part of a virtual object being in front of a real-world object, part of the virtual object being behind the real-world object, and part of the virtual object being coincident with the real-world object. Displays capable of going from 0% to 100% opacity at low cost, power, and weight are the most desirable for this use. Moreover, the opacity filter can be rendered in color, such as with a color LCD or with other displays such as organic LEDs, to provide a wide field of view. More details of an opacity filter are provided in U.S. patent application Ser. No. 12/887,426, "Opacity Filter For See-Through Mounted Display," filed on Sep. 21, 2010, incorporated herein by reference in its entirety.

Head mounted display device 2 may also include a system for tracking the position of the user's eyes. For example, head mounted display device 2 includes eye tracking assembly 134 which will include an eye tracking illumination device 134A (see FIG. 4A) and eye tracking camera 134B (see FIG. 4A). In one embodiment, eye tracking illumination source 134A includes one or more infrared (IR) emitters, which emit IR light toward the eye. Eye tracking camera 134B includes one or more cameras that sense the reflected IR light. The position of the pupil can be identified by known imaging techniques which detects the reflection of the cornea. For example, see U.S. Pat. No. 7,401,920, entitled "Head Mounted Eye Tracking and Display System", issued Jul. 22, 2008 to Kranz et al., incorporated herein by reference. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eye usually moves in unison. However, it is possible to track each eye separately.

In one embodiment, the eye tracking illumination device 134A will use four IR LEDs and the eye tracking camera 134B users four IR photo detectors (not illustrated) in rectangular arrangement so that there is one IR LED and IR photo detector at each corner of the lens of head mounted display device 2. Light from the LEDs reflect off the eyes. The amount of infrared light detected at each of the four IR photo detectors determines the pupil direction. That is, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but only one infrared CCD on the side of the lens of head mounted display device 2. The CCD will use a small mirror and/or lens (fish eye) such that the CCD can image up to 75% of the visible eye from the glasses frame. The CCD will then sense an image and use computer vision to find the eye position, much like as discussed above. More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 130) to detect the electrical potential while the eyes move around and effectively read out what the eyes are doing in real time. Other embodiments for tracking eyes can also be used. Suitable tracking technologies is disclosed in U.S. Patent Application Publication 2012/0154277, "Optimized Focal Area for Augmented Reality Displays," filed on Dec. 17, 2010, which is incorporated herein by reference in their entirety.

FIG. 3 only shows half of head mounted display device 2. A full head mounted display device 2 would include (where applicable) another set lenses, another opacity filter another light guide optical element, another micro display, another lens, room facing camera, eye tracking assembly, micro display, earphones, and temperature sensor.

Figure 4A:
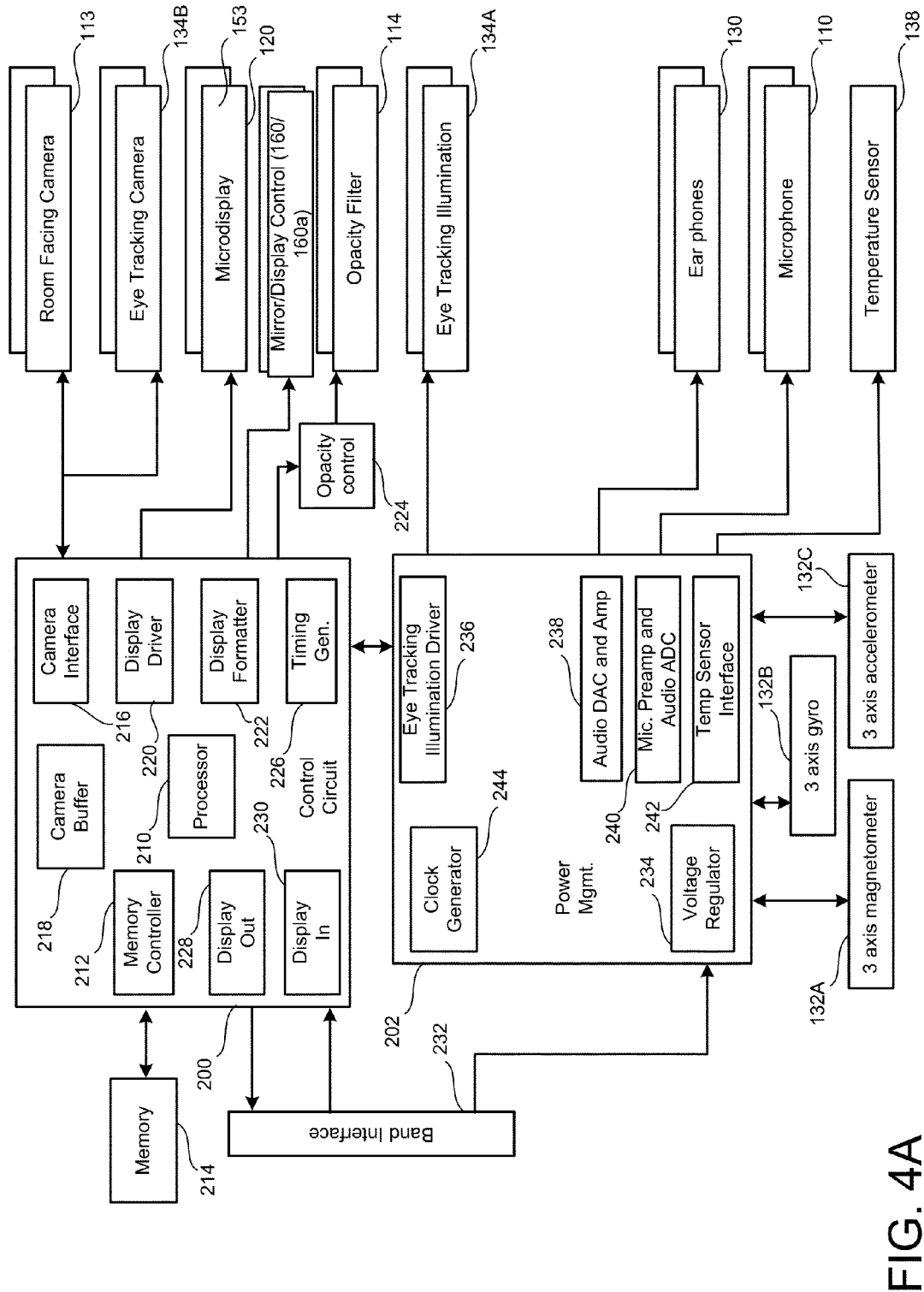
FIG. 4A is a block diagram of one embodiment of the components of a head mounted display unit.
Figure 4B:
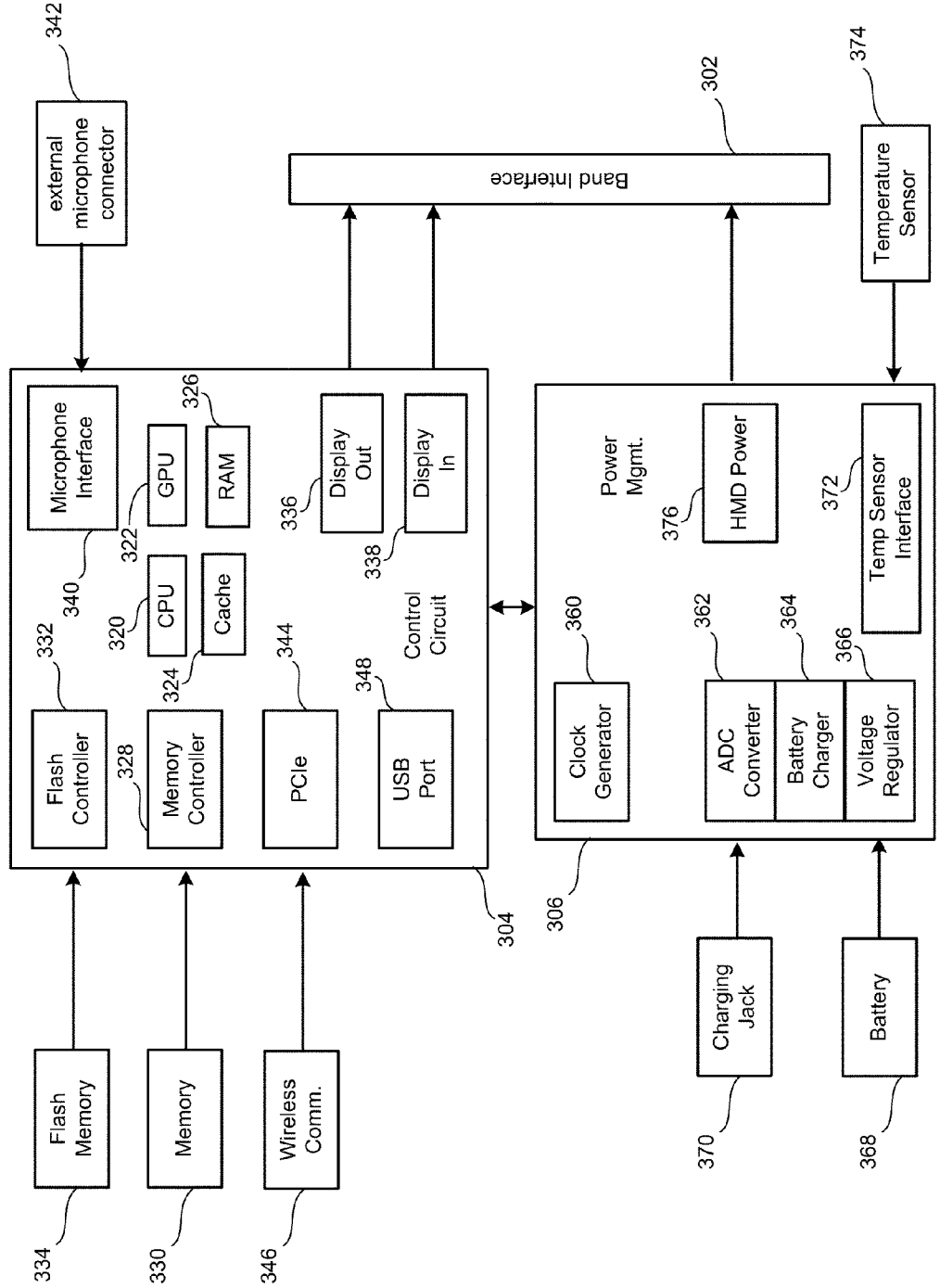
FIG. 4B is a block diagram of one embodiment of the components of a processing unit associated with a head mounted display unit.

FIG. 4A is a block diagram depicting the various components of head mounted display device 2. It will be understood with reference to FIG. 3 that some components illustrated in FIG. 4A may not be present in the embodiment shown in FIG. 3. FIG. 4B is a block diagram describing the various components of processing unit 4 of FIG. 1. Head mounted display device 2, the components of which are depicted in FIG. 4A, is used to display an optimized image to the user (user 2222). Additionally, the head mounted display device components of FIG. 4A may include many sensors that track various conditions including the head position and rotation of user 2222. Head mounted display device 2 will receive instructions about the virtual image from processing unit 4 and will provide the sensor information back to processing unit 4. Processing unit 4, the components of which are depicted in FIG. 4B will receive the sensory information from head mounted display device 2 and also from hub computing device 12 (See FIG. 1). Based on that information, processing unit 4 will determine where and when to provide a virtual image to the user and send instructions accordingly to the head mounted display device of FIG. 4A.

Note that some of the components of FIG. 4A (e.g., rear facing camera 113, eye tracking camera 134B, micro display 120 or 153, opacity filter 114, eye tracking illumination 134A, and earphones 130) are shown in shadow to indicate that there may be two of each of those devices, one for the left side and one for the right side of head mounted display device 2. FIG. 4A shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 2222, timing generator 226, display out interface 228, and display in interface 230. In one embodiment, all of components of control circuit 200 are in communication with each other via dedicated lines or one or more buses. In another embodiment, each of the components of control circuit 200 is in communication with processor 210. Camera interface 216 provides an interface to the two room facing cameras 113 and stores images received from the room facing cameras in camera buffer 218. Display driver 220 will drive micro display 120 or 153. Display formatter 2222 provides information, about the virtual image being displayed on micro display 120 or 153, to opacity control circuit 224, which controls opacity filter 114. Timing generator 226 is used to provide timing data for the system. Display out interface 228 is a buffer for providing images from room facing cameras 113 to processing unit 4. Display in 230 is a buffer for receiving images such as a virtual image to be displayed on micro display 120. Display out 228 and display in 230 communicate with band interface 232 which is an interface to processing unit 4. Display driver 220 may also drive mirror controller 162 to position the mirror 166 to display a focused image in accordance with the above embodiment of FIGS. 3C and 3D.

Power management circuit 202 includes voltage regulator 234, eye tracking illumination driver 236, audio DAC and amplifier 238, microphone preamplifier audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR light source for eye tracking illumination 134A, as described above. Audio DAC and amplifier 238 receive the audio information from earphones 130. Microphone preamplifier and audio ADC 240 provide an interface for microphone 110. Temperature sensor interface 242 is an interface for temperature sensor 138.

Power management unit 202 also provides power and receives data back from three axis magnetometer 132A, three axis gyro 132B and three axis accelerometer 132C.

FIG. 4B is a block diagram describing the various components of processing unit 4. FIG. 4B shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, BlueTooth communication device, infrared communication device, etc. The USB port can be used to dock the processing unit 4 to hub computing device 12 in order to load data or software onto processing unit 4, as well as charge processing unit 4. In one embodiment, CPU 320 and GPU 322 are the main workhorses for determining where, when and how to insert virtual images into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (located on the wrist band of processing unit 4). Analog to digital converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 2.

The above-described system will be configured to insert a virtual image into the field of view of a user so that the virtual image replaces the view of a real world object. Alternatively, the virtual image can be inserted without replacing the image of a real world object. In various embodiments, the virtual image will be adjusted to match the appropriate orientation, size and shape based on the object being replaced or the environment for which the image is being inserted into. In addition, the virtual image can be adjusted to include reflectivity and shadows. In one embodiment, head mounted display device 2, processing unit 4 and hub computing device 12 work together as each of the devices includes a subset of sensors that are used to obtain the data for determining where, when and how to insert the virtual images. In one embodiment, the calculations that determine where, how and when to insert a virtual image are performed by hub computing device 12. In another embodiment, those calculations are performed by processing unit 4. In another embodiment some of the calculations are performed by hub computing device 12 while other calculations are performed by processing unit 4. In other embodiments, the calculations can be performed by head mounted display device 2.

In one example embodiment, hub computing device 12 will create a model of the environment that the user is in and track various moving objects in that environment. In addition, hub computing device 12 tracks the position and orientation of head mounted display device 2. The model and the tracking information are provided from hub computing device 12 to processing unit 4. Sensor information may also be obtained from head mounted display device 2. Processing unit 4 then uses the additional sensor information it receives from head mounted display device 2 to refine the field of view of the user and provide instructions to head mounted display device 2 on how, where and when to insert the virtual image.

Figure 5:
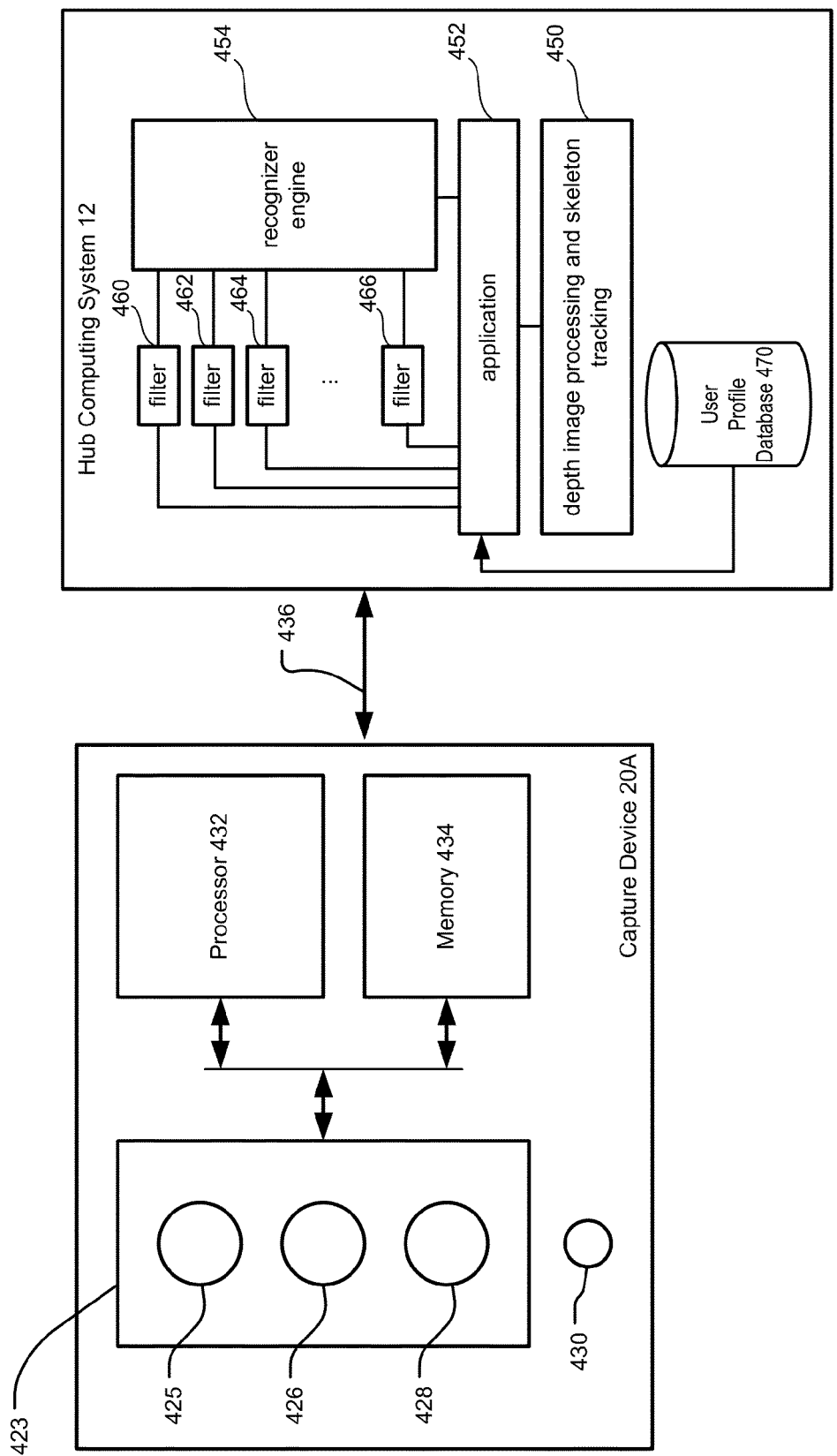
FIG. 5 is a block diagram of one embodiment of the components of a hub computing system used with head mounted display unit.

FIG. 5 illustrates an example embodiment of hub computing system 12 with a capture device. In one embodiment, capture devices 20A and 20B are the same structure, therefore, FIG. 5 only shows capture device 20A. According to an example embodiment, capture device 20A may be configured to capture video with depth information including a depth image that may include depth values via any suitable technique including, for example, time-of-flight, structured light, stereo image, or the like. According to one embodiment, the capture device 20A may organize the depth information into "Z layers," or layers that may be perpendicular to a Z axis extending from the depth camera along its line of sight.

As shown in FIG. 5, capture device 20A may include a camera component 423. According to an example embodiment, camera component 423 may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 23 may include an infra-red (IR) light component 425, a three-dimensional (3-D) camera 426, and an RGB (visual image) camera 428 that may be used to capture the depth image of a scene. For example, in time-of-flight analysis, the IR light component 425 of the capture device 20A may emit an infrared light onto the scene and may then use sensors (in some embodiments, including sensors not shown) to detect the backscattered light from the surface of one or more targets and objects in the scene using, for example, the 3-D camera 426 and/or the RGB camera 428. In some embodiments, pulsed infrared light may be used such that the time between an outgoing light pulse and a corresponding incoming light pulse may be measured and used to determine a physical distance from the capture device 20A to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20A to a particular location on the targets or objects by analyzing the intensity of the reflected beam of light over time via various techniques including, for example, shuttered light pulse imaging.

In another example embodiment, capture device 20A may use a structured light to capture depth information. In such an analysis, patterned light (i.e., light displayed as a known pattern such as grid pattern, a stripe pattern, or different pattern) may be projected onto the scene via, for example, the IR light component 424. Upon striking the surface of one or more targets or objects in the scene, the pattern may become deformed in response. Such a deformation of the pattern may be captured by, for example, the 3-D camera 426 and/or the RGB camera 428 (and/or other sensor) and may then be analyzed to determine a physical distance from the capture device to a particular location on the targets or objects. In some implementations, the IR Light component 425 is displaced from the cameras 425 and 426 so triangulation can be used to determined distance from cameras 425 and 426. In some implementations, the capture device 20A will include a dedicated IR sensor to sense the IR light, or a sensor with an IR filter.

According to another embodiment, the capture device 20A may include two or more physically separated cameras that may view a scene from different angles to obtain visual stereo data that may be resolved to generate depth information. Other types of depth image sensors can also be used to create a depth image.

The capture device 20A may further include a microphone 430, which includes a transducer or sensor that may receive and convert sound into an electrical signal. Microphone 430 may be used to receive audio signals that may also be provided by hub computing system 12.

In an example embodiment, the capture device 20A may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transmitting the data to hub computing system 12.

Capture device 20A may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 5, in one embodiment, memory 434 may be a separate component in communication with the image capture component 423 and processor 432. According to another embodiment, the memory 434 may be integrated into processor 432 and/or the image capture component 422.

Capture devices 20A and 20B are in communication with hub computing system 12 via a communication link 436. The communication link 436 may be a wired connection including, for example, a USB connection, a Firewire connection, an Ethernet cable connection, or the like and/or a wireless connection such as a wireless 802.11b, g, a, or n connection. According to one embodiment, hub computing system 12 may provide a clock to capture device 20A that may be used to determine when to capture, for example, a scene via the communication link 436. Additionally, the capture device 20A provides the depth information and visual (e.g., RGB) images captured by, for example, the 3-D camera 426 and/or the RGB camera 428 to hub computing system 12 via the communication link 436. In one embodiment, the depth images and visual images are transmitted at 30 frames per second; however, other frame rates can be used. Hub computing system 12 may then create and use a model, depth information, and captured images to, for example, control an application such as a game or word processor and/or animate an avatar or on-screen character.

Hub computing system 12 includes depth image processing and skeletal tracking module 450, which uses the depth images to track one or more persons detectable by the depth camera function of capture device 20A. Depth image processing and skeletal tracking module 450 provides the tracking information to application 453, which can be a video game, productivity application, communications application or other software application etc. The audio data and visual image data is also provided to application 452 and depth image processing and skeletal tracking module 450. Application 452 provides the tracking information, audio data and visual image data to recognizer engine 454. In another embodiment, recognizer engine 454 receives the tracking information directly from depth image processing and skeletal tracking module 450 and receives the audio data and visual image data directly from capture devices 20A and 20B.

Recognizer engine 454 is associated with a collection of filters 460, 462, 464, . . . , 466 each comprising information concerning a gesture, action or condition that may be performed by any person or object detectable by capture device 20A or 20B. For example, the data from capture device 20A may be processed by filters 460, 462, 464, . . . , 466 to identify when a user or group of users has performed one or more gestures or other actions. Those gestures may be associated with various controls, objects or conditions of application 452. Thus, hub computing system 12 may use the recognizer engine 454, with the filters, to interpret and track movement of objects (including people).

Capture devices 20A and 20B provide RGB images (or visual images in other formats or color spaces) and depth images to hub computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device. Hub computing system 12 will use the RGB images and depth images to track a user's or object's movements. For example, the system will track a skeleton of a person using the depth images. There are many methods that can be used to track the skeleton of a person using depth images. One suitable example of tracking a skeleton using depth image is provided in U.S. Pat. No. 8,295,546, "Pose Tracking Pipeline" filed on Oct. 21, 2009, Craig, et al. (hereinafter referred to as the '546 Application), incorporated herein by reference in its entirety. The process of the '546 Application includes acquiring a depth image, down sampling the data, removing and/or smoothing high variance noisy data, identifying and removing the background, and assigning each of the foreground pixels to different parts of the body. Based on those steps, the system will fit a model to the data and create a skeleton. The skeleton will include a set of joints and connections between the joints. Other methods for tracking can also be used. Suitable tracking technologies are also disclosed in the following four U.S. patent applications, all of which are incorporated herein by reference in their entirety: U.S. patent application Ser. No. 12/475,308, "Device for Identifying and Tracking Multiple Humans Over Time," filed on May 29, 2009; U.S. patent application Ser. No. 12/696,282, "Visual Based Identity Tracking," filed on Jan. 29, 2010; U.S. patent application Ser. No. 12/641,788, "Motion Detection Using Depth Images," filed on Dec. 18, 2009; and U.S. patent application Ser. No. 12/575,388, "Human Tracking System," filed on Oct. 7, 2009.

Recognizer engine 454 includes multiple filters 460, 462, 464, . . . , 466 to determine a gesture or action. A filter comprises information defining a gesture, action or condition along with parameters, or metadata, for that gesture, action or condition. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Parameters may then be set for that gesture. Where the gesture is a throw, a parameter may be a threshold velocity that the hand has to reach, a distance the hand travels (either absolute, or relative to the size of the user as a whole), and a confidence rating by the recognizer engine that the gesture occurred. These parameters for the gesture may vary between applications, between contexts of a single application, or within one context of one application over time.

Filters may be modular or interchangeable. In one embodiment, a filter has a number of inputs (each of those inputs having a type) and a number of outputs (each of those outputs having a type). A first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

Recognizer engine 454 may have a base recognizer engine that provides functionality to the filters. In one embodiment, the functionality that recognizer engine 454 implements includes an input-over-time archive that tracks recognized gestures and other input, a Hidden Markov Model implementation (where the modeled system is assumed to be a Markov process—one where a present state encapsulates any past state information used to determine a future state, so no other past state information must be maintained for this purpose—with unknown parameters, and hidden parameters are determined from the observable data), as well as other functionality used to solve particular instances of gesture recognition.

Filters 460, 462, 464, . . . , 466 are loaded and implemented on top of the recognizer engine 454 and can utilize services provided by recognizer engine 454 to all filters 460, 462, 464, . . . , 466. In one embodiment, recognizer engine 454 receives data to determine whether it meets the requirements of any filter 460, 462, 464, . . . , 466. Since these provided services, such as parsing the input, are provided once by recognizer engine 454 rather than by each filter 460, 462, 464, . . . , 466, such a service need only be processed once in a period of time as opposed to once per filter for that period, so the processing used to determine gestures is reduced.

Application 452 may use the filters 460, 462, 464, . . . , 466 provided with the recognizer engine 454, or it may provide its own filter, which plugs in to recognizer engine 454. In one embodiment, all filters have a common interface to enable this plug-in characteristic. Further, all filters may utilize parameters, so a single gesture tool below may be used to debug and tune the entire filter system.

More information about recognizer engine 454 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009, both of which are incorporated herein by reference in their entirety.

In one embodiment, hub computing system 12 includes a user profile database 470 that includes user-specific information related to one or more users interacting with hub computing system 12. In one example, the user-specific information includes information related to a user such as the user's expressed preferences, the user's friends' list, the user's preferred activities, a list of the user's reminders, the user's social groups, the user's current location, the user's past intents to interact with objects in the user's environment and other user created content, such as the user's photos, images and recorded videos. In one embodiment, the user-specific information may be obtained from one or more data sources such as the user's social networking sites, address book, email data, Instant Messaging data, user profiles or other sources on the Internet. In one approach, and as will be discussed in detail below, the user-specific information is utilized to automatically determine the user's intent to interact with one or more objects in the user's environment.

Figure 6:
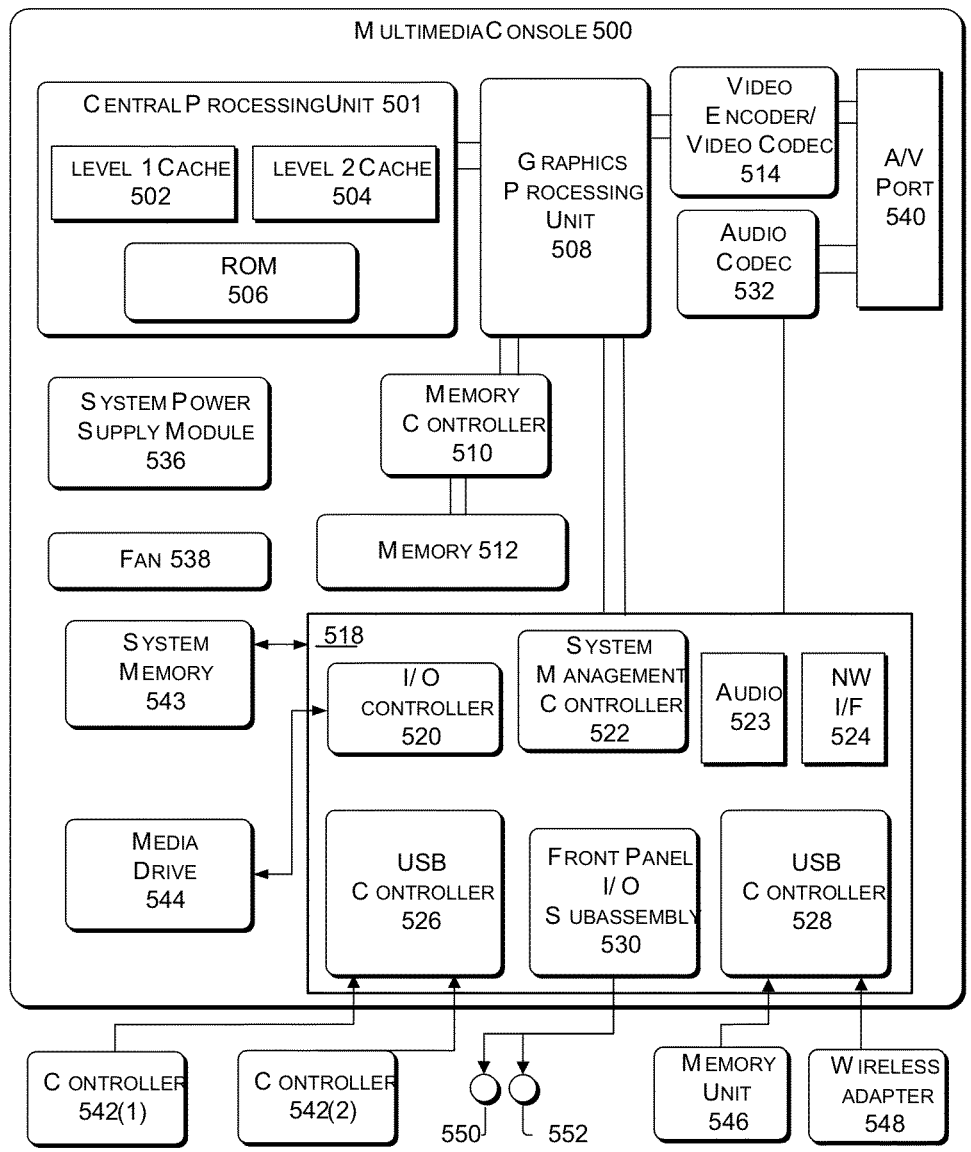
FIG. 6 is a block diagram of one embodiment of a computing system that can be used to implement the hub computing system described herein.

FIG. 6 illustrates an example embodiment of a computing system that may be used to implement hub computing system 12. As shown in FIG. 6, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 144 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 500. A system power supply module 536 provides power to the components of the multimedia console 500. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

When the multimedia console 500 is powered ON, a set amount of hardware resources are reserved for system use by the multimedia console operating system. These resources may include a reservation of memory, CPU and GPU cycle, networking bandwidth, etc. Because these resources are reserved at system boot time, the reserved resources do not exist from the application's view. In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

After multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture devices 20A and 20B may define additional input devices for the console 500 via USB controller 526 or other interface. In other embodiments, hub computing system 12 can be implemented using other hardware architectures. The implementation of hub computing system 12 does not require any particular hardware architecture.

Figure 7:
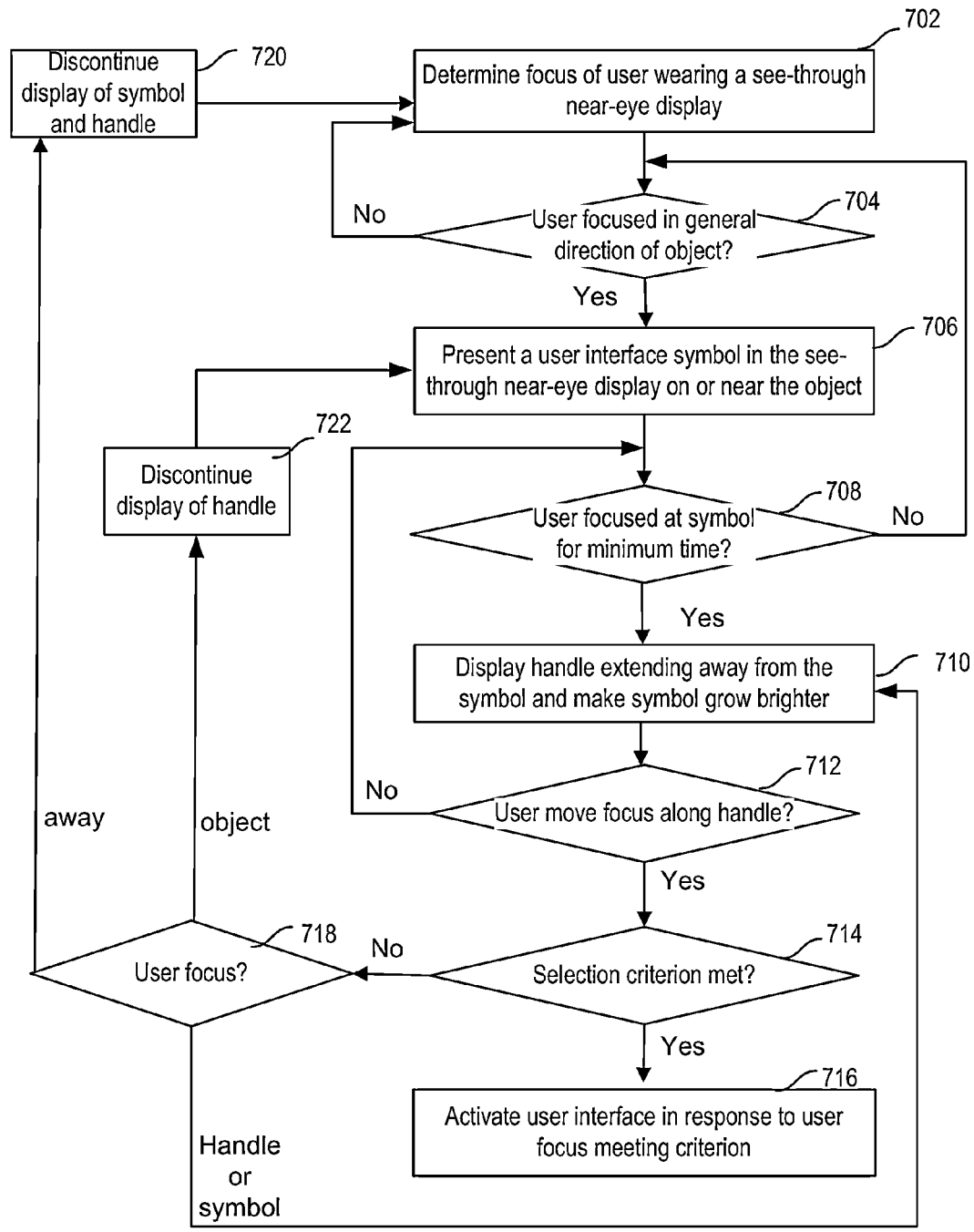
FIG. 7 is a flow chart depicting a process according to an embodiment of the present technology.

FIG. 7 is a simplified flow chart depicting a process according to an embodiment of the present technology. Other steps could be added and many variations are possible. Not all steps are required. In one embodiment, the processing depicted in FIG. 7 may be performed by one or more components of head mounted device 2 as depicted in FIG. 1. Various steps of the process could be performed by software, hardware, or some combination of hardware and software. Herein, the term "logic" refers to software, hardware, or some combination of hardware and software. Thus, the HMD 2 may have logic that is configured to perform operations described in FIG. 7. The logic that performs some or all of the operations could be off the HMD 2 at hub computing system 12, or some other processor.

It should be noted that steps illustrated in FIG. 7 may be performed in parallel or simultaneously, and steps may be performed continuously. For example, step 702 could be performed continuously such that the user's focus is continuously tracked.

In step 702, a focus of a user that is wearing a HMD 2 is determined. The focus refers to where the user is directing their attention (e.g., looking). In one embodiment, the focus is determined by tracking head orientation and/or position. This may include tracking head translation, rotation, etc. Thus, when the user rotates their head to look at on object, the system 100 determines what they are focused on. In one embodiment, the focus is determined based on eye gaze tracking. In one embodiment, the focus is determined based on a combination of eye gaze tracking and head tracking.

In one embodiment, information identifying the position and orientation of the user and the head mounted display device 2 associated with the user is transmitted from the hub computing device 12 and received by processing unit 4. This could be defined in a 3D coordinate system. FIG. 2 shows one example of a 3D coordinate system 2252 in which the position and orientation of the user, their head, and the head mounted display device 2 might be defined. For example, hub computing device 12 will use one or more depth images and one or more visual images to track a user (e.g., using skeleton tracking). One or more depth images and one or more visual images can be used to determine the position and orientation of the user and the head mounted display device associated with the user.

In one embodiment, information sensed locally (e.g., from the head mounted device 2) by one or more sensors embedded in the head mounted display device 2 is used in step 702. Various sensor technologies embedded in the head mounted display including the accelerometer, magnetometer and gyroscope, or other sensor technologies may be used to identify head position and orientation. Other sensor technologies may include time of flight, spatial scan, mechanical linkages, phase-difference sensing, and/or direct field sensing. In one embodiment, processing unit 4 will access data from three axis gyro 132B, three axis accelerometer 132C, and three axis magnetometer 132A.

In one embodiment, information identifying a position of the user's eye in the environment is used in step 702. This is also known as the "eye tracking" as discussed above. For example, in one embodiment for tracking a position of the user's eye in the environment, the user's eye can be illuminated using infrared light from eye tracking illumination 134A. The reflection from the eye is detected using one or more eye tracking cameras 134B. The reflection data is sent from head mounted display device 2 to processing unit 4. Processing unit 4 will determine the position of the eye based on the reflection data, as discussed above. In one embodiment, the information identifying a position of the user's eye in the environment is received or accessed by processing unit 4. Suitable tracking technologies are disclosed in U.S. Patent Application Publication 2012/ 0154277, "Optimized Focal Area for Augmented Reality Displays," filed on Dec. 17, 2010, which is incorporated herein by reference in its entirety.

Additional information such as information retrieved from the cloud, information detected and/or gathered by one or more external devices, and other relevant information may also be used in step 702. Techniques such as Simultaneous Localization and Mapping (SLAM) using RGB and/ or depth sensor data may be employed to provide a real-time position of the user's head relative to the mapped environment. Environmental typography may be identified using data from the cloud and/or depth sensor data. Regions of the user's body can be identified (e.g., hand, arm, torso, legs) using the depth sensor when the user is looking at him or herself.

In step 704, the system 100 determines whether the user's focus is in a general direction of an object associated with the user interface symbol. At this point in time, the user interface symbol may or may not be displayed in the HMD 2. The user interface symbol could be associated with a real world object or a virtual object. For example, the symbol could be associated with an actual real world book or with a virtual dog.

Figure 8A:
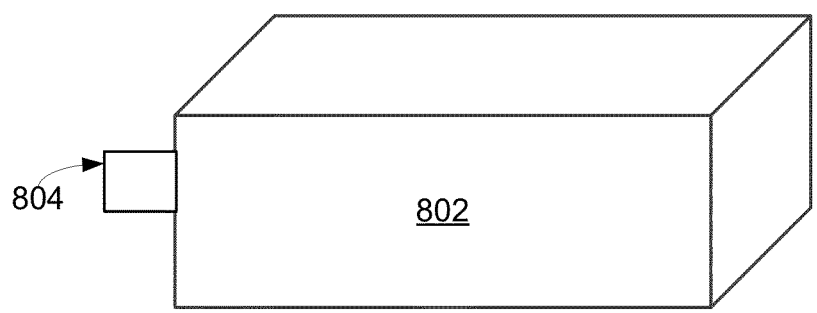
FIG. 8A shows an example of a user interface symbol presented on an object in accordance with one embodiment.

If the system 100 determines that the user is focused in the general direction of the object, then the system 100 presents a symbol, in step 706. FIG. 8A shows an example of a user interface symbol presented on an object in accordance with one embodiment. A user interface symbol 804 is presented in the HMD 2 such that it appears as being associated with the object 802. The object 802 could be a real world object or a virtual object being rendering in the HMD 2. In this example, the symbol 804 is presented on one edge of the object 802, and appears to touch the object 802. Many other possibilities exist. The symbol 804 is not required to appear to be in contact with the object 802. However, being close by helps the user to understand that the symbol 804 may serve as a way to initiate a user interaction, user input, etc. in connection with the object 802.

In step 706, the system 100 could present more than one symbol 804 on the object 802. This is because an object 802 could have more than one symbol 804 associated with it.

Note that one option is to present the symbol 804 in the HMD 2 even if the user is not looking at the object 802. In this case, the system 100 might make the symbol 804 somewhat more visible when the user looks at the object 802, or in its general direction.

If the system determined in step 704 that the user is not focused in the direction of the object 802, then control passes to step 702 to continue to monitor the user's focus. Note that the symbol 804 need not be displayed if the user is not focused in the direction of the object 802, although symbol 804 optionally is displayed in some format. This format could be different from when the user is looking in the direction of the object 802. For example, the symbol 804 might be less perceptible.

After presenting the symbol 804 in step 706, the system 100 determines whether the user is focused on the symbol 804, in step 708. This can be achieved by monitoring the user's head orientation and/or position and/or the user's eye gaze. In one embodiment, the system 100 determines whether the user's attention is focused at the symbol 804 for some minimum time.

As noted, the object 802 can have more than one symbol 804 associated with it. In one embodiment, the system 100 determines which symbol 804 the user is most directly focused on and highlights that symbol 804.

If the user's attention is focused on the symbol 804, then the system 100 displays a handle in the HMD 2 extending away from the symbol 804, in step 710. In one embodiment, when the user first focuses on the symbol 804 it is highlighted. An example of highlighting is to make the symbol 804 gleam, glow, shine, grow brighter, etc. Thus, the symbol 804 may be referred to as a "gleam." If the user continues to look at the symbol 804, then the handle extends outward.

Figure 8B:
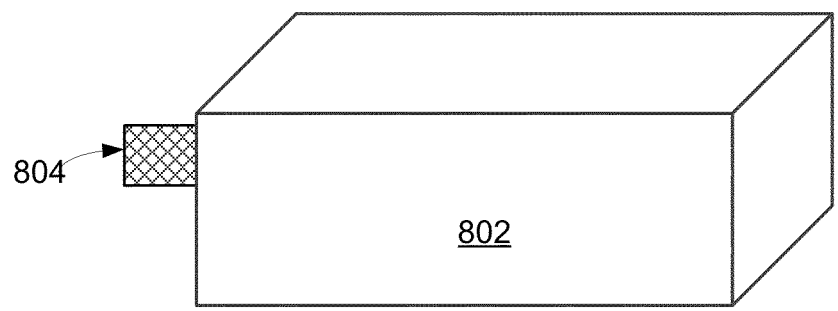
FIG. 8B depicts one example in which the symbol is highlighted.
Figure 8C:
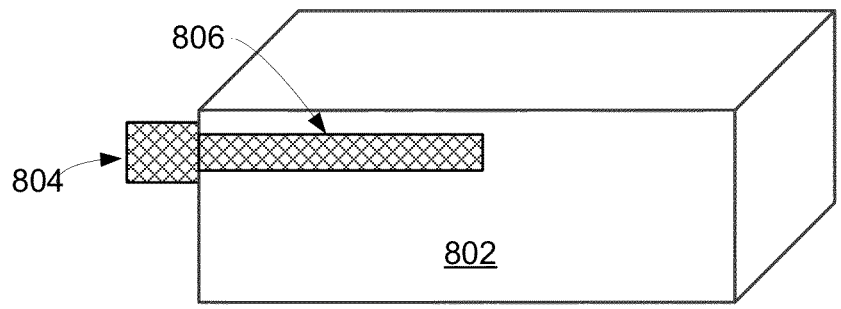
FIG. 8C depicts on example in which a handle extends away from the symbol.

FIG. 8B depicts one example in which the symbol 804 is highlighted. FIG. 8C depicts one example in which a handle 806 extends away from the symbol 804. The handle 806 may or may not have a text label associated with it. The handle 806 may or may not have an icon associated with it.

After the handle 806 is presented, the system 100 determines whether the user moves their focus away from the symbol 804 along the handle 806, in step 712. If not, the system 100 returns to step 708. The user might choose to look away from the symbol 804 after initially looking at it. In this case, the test of step 708 would be "no" and control passes to step 704.

In one embodiment, step 712 includes the system 100 determining whether the user moves their head in a way that indicates that their focus is moving along the handle 806. This could be a rotation of the head, as one example.

In one embodiment, the system 100 determines whether the user moves their eyes in a way that indicates that their eye gaze is moving along the handle 806. Typically, eye gaze determined by eye tracking is considered to be a point at which the user's eye (or eyes) are momentarily are fixed. In this case, the system 100 can track the different points at which the user is gazing and determine that these points are moving progressively along the handle 806.

The shift in user focus need not be exactly along the handle 806. For example, when tracking head rotation for the example of FIG. 8C, even if when the user rotates their head to the right they also rotate the head up or down such that the focus is somewhat above or below the handle 806, the system 100 can still consider this to be focus along the handle 806. However, if the user looks far above (or below) the handle 806 this can indicate that the user is not attempting to look along the handle 806 but has shifted their attention to something else. The degree of freedom that the system 100 provides here may be an adjustable parameter. Note that this system 100 can determine the user's focus along the handle 806 by tracking head orientation and/or eye gaze.

If the system 100 determines that the user has shifted their focus along the handle 806, the system 100 determines whether a selection criterion has been met in step 714. The selection criterion could be that the user's focus is at or near the end of the handle 806, as one example.

If the selection criterion is met, then a user interface element is activated, in step 716. One example of this is to present a spokes menu in the HMD 2. Example spokes menus are discussed herein. The user interface element is activated at or near the end of the handle 806 that is away from the symbol 804, in one embodiment.

Returning to the discussion of step 714, in some cases the user will not move their focus along the handle 806 after looking at the symbol 804. Furthermore, the user may look away from the symbol 804.

In one case, after looking at the symbol 804, the user looks away from both the symbol 804 and the object 802. In this case, the system 100 may discontinue presenting the handle 806 and the symbol 804. This is represented by step 718 resulting in the "away" condition. In this case, step 720 is to discontinue presenting the symbol 804 and the handle 806 in the HMD 2. In this case, the system 100 may return to monitoring the focus of the user in step 702.

In another case, the user continues to focus on the handle 806, but the selection criterion is not met. For example, the user does not look far enough to the end of the handle 806. In another case, the user looks back at the symbol 804 after looking at the handle 806 (but not meeting the selection criterion). In either case, the system 100 continues to present the handle 806. This is represented by the "handle or symbol" condition of step 718 passing control to step 710.

Still another possibility is that the user looks away from the symbol 804, but is still looking at the object 802. In this case, the system 100 might discontinue displaying the handle 806. However, the symbol 804 is still displayed. This is represented by the "object" condition of step 718 passing control to step 722. Control then passes to step 706 in this case.

During the process of FIG. 7, the system 100 may provide feedback to the user. This could be audio feedback as one example. This feedback could be provided in connection with a variety of events. For example, when the user looks at the symbol 804 audio feedback could be provided. When the user looks along the handle 806, audio feedback could be provided to assist the user in knowing that progress is being made. Visual feedback could also be provided as the user moves their focus along the handle 806.

In some cases, the result of step 714 is selection of an input. For example, the object 802 might be a virtual dog that wags its tail as a result of the selection in step 714. In this example, this might be the only selection that is associated with the symbol 804.

In other cases, the result of step 714 is to bring up a menu. One type of menu is referred to herein as a "spokes menu." FIG. 8D is an example of one embodiment of a spokes menu 808. The object 802 that is associated with the spokes menu 808 is also shown in FIG. 8D. The spokes menu 808 has a central hub 816, which is this example is represented as a black dot. The central hub 816 is not necessarily shown to the user in the HMD 2. The central hub 816 is located where the end of the handle 806 that is opposite the symbol 804 was, in one embodiment. However, the handle 806 and symbol 804 are no longer presented in the display when the spokes menu 808 is displayed, in one embodiment. In one embodiment, the spokes menu 808 appears to grow out of the end of the handle 806; then, the handle 806 and symbol 804 disappear.

The menu 808 has a number of menu items 810 at the exterior, around the central hub 816. There is a spoke 812 between each menu item 810 and the hub 816. The spokes 812 are not necessarily shown to the user at all times. Initially, it is expected that the user's focus will be at the hub 816. This is due to the hub 816 being located at the end of the handle 806. As previously noted, the user may shift their focus towards the end of the handle 806 to activate the spoke menu 808. By activating this means causing the HMD to display the spoke menu 808.

The user is able to select a menu item 810 by shifting their focus from the hub 816 towards one of the menu items 810. Initially, the spoke 812 between the hub 816 and that menu item 810 might not be shown at all. As the user shifts their focus towards the menu item 810, the spoke 812 grows towards the menu item 810, in one embodiment. Further details are discussed below.

Figure 9B:
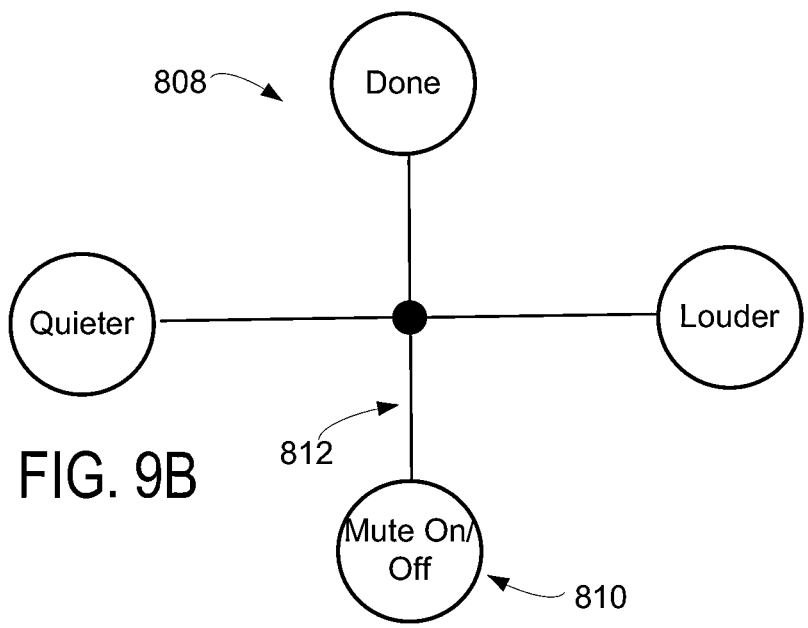

FIG. 9A is another example of one embodiment of a spokes menu 808. In this example, the object 802 with which the spokes menu 808 is associated is not depicted. Also, the spokes 812 and hub 816 and are depicted for purposes of discussion. The spokes 812 and hub 816 need not be presented in the HMD 2. Typically, the menu items 810 are actions associated with the object 802, although this is not a requirement. In this example, the menu items 810 include various controls (e.g., volume, play/pause, FF/Rev) for operating a video or the like. In this example, the menu items 810 have text labels, but that is not required. The spokes 812 may or may not have text labels associated with them. The spokes 812 may or may not have icons associated with them.

Figure 9C:
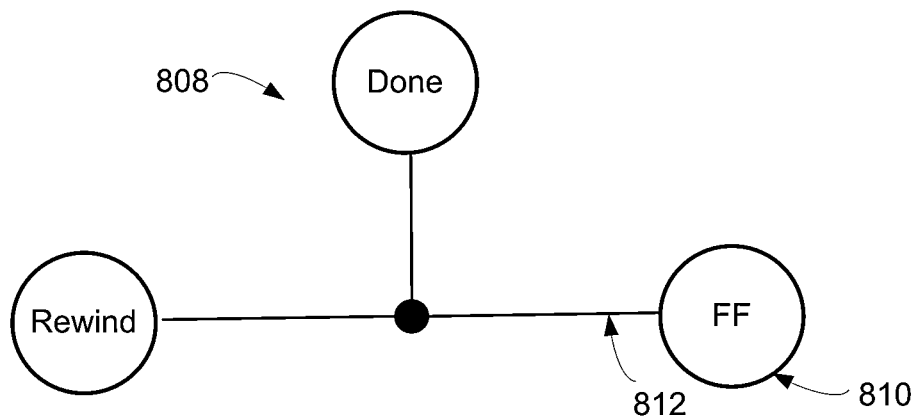

In one embodiment, spoke menus 808 can be nested. This means that selection of a menu item 810 can spawn another spoke menu 808. For example, if the user selects the menu item 810 labeled volume, this could spawn the spoke menu 808 depicted in FIG. 9B. For example, if the user selects the menu item 810 labeled FF/Rev, this could spawn the spoke menu 808 depicted in FIG. 9C. Spawning a menu means that the menu is presented in the HMD 2.

Figure 10:
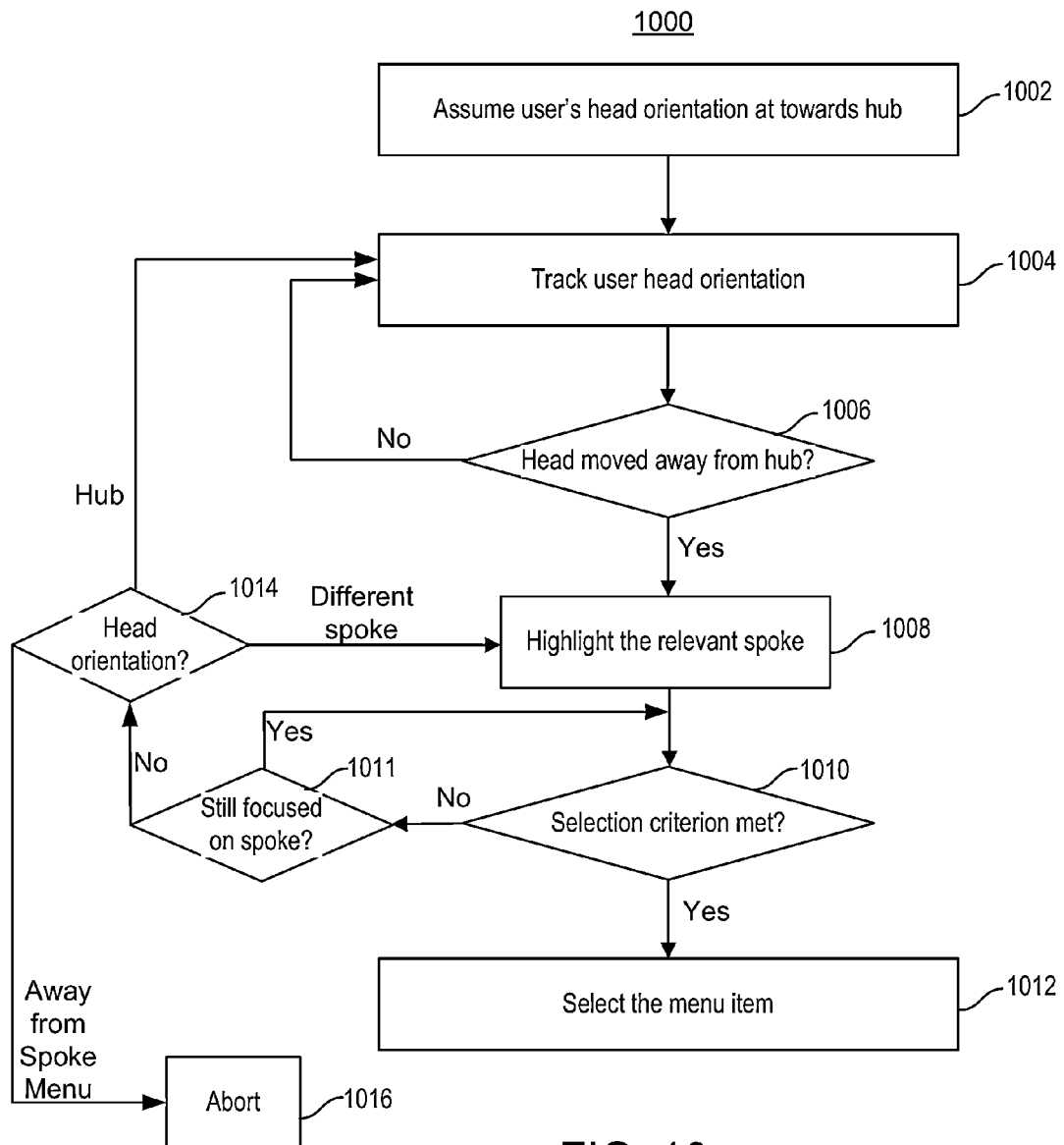
FIG. 10 is a flowchart of one embodiment of a process providing for a selection of a menu item on a spokes menu.

FIG. 10 is a flowchart of one embodiment of a process 1000 providing for a selection of a menu item 810 on a spokes menu 808. Process 1000 may be performed after step 714 from FIG. 7. Recall the step 714 results in a spokes menu 808 being activated, in one embodiment. For example, a spokes menu 808 such as depicted in FIG. 8D or 9A is activated. In process 1000, head tracking is used. Eye tracking need not be used in process 1000. Process 1000 may be performed by hardware, software, or some combination of hardware and software. In one embodiment, process 1000 is performed, at least in part, by an HMD 2. A processor coupled to the HMD 2 can assist in some of the steps.

At the beginning of process 1000, the system 100 may assume that the user's attention is focused on the hub 816 of the spokes menu 808. This is described in step 1002. This assumption may be made given that the hub 816 may be located at or near the end of the handle 806. As noted above, the hub 816 does not need to be visually presented in the HMD 2. Also, it is not necessary that the user is actually looking directly at the location of the hub 816.

Step 1004 is tracking the user's head orientation and/or position. This has already been discussed. The head tracking may be performed continuously throughout process 1000.

In step 1006, the system 100 determines whether the user's head is moving such that the user's focus is moving away from the hub 816. There may be some "safe zone" near the hub 816 such that the system 100 does not consider this to be a significant head movement unless the head moves some defined amount (e.g., beyond a threshold). The manner in which the head movement is measured can vary. One technique is to track head rotation in terms of degrees. The head may need to move some minimum amount in terms of degree of rotation to consider this to be a significant movement.

If there is head movement, then the system 100 highlights the relevant spoke 812 in step 1008. In one embodiment, only a portion of the spoke 812 is highlighted. This portion may be the portion that is closest to the hub 816. The amount by which the spoke 812 is filled depends on how far the user has moved (e.g., rotated) their head, in one embodiment.

Figure 11A:
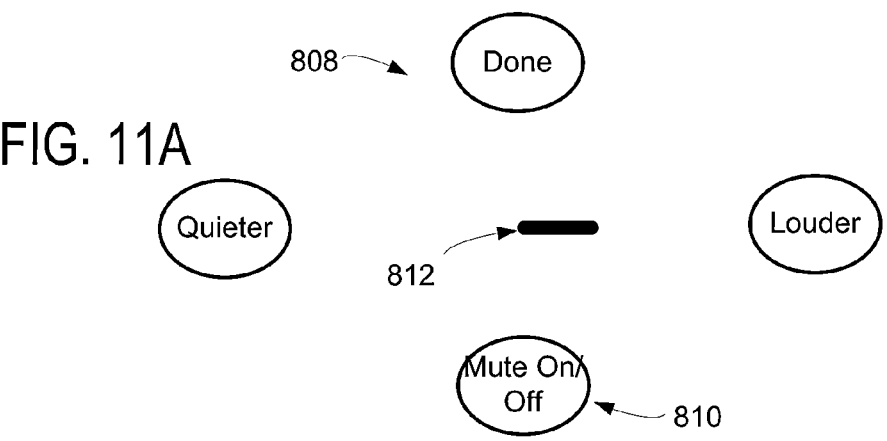
FIGS. 11A, 11B and 11C show an example of a spoke being progressively filled.
Figure 11B:
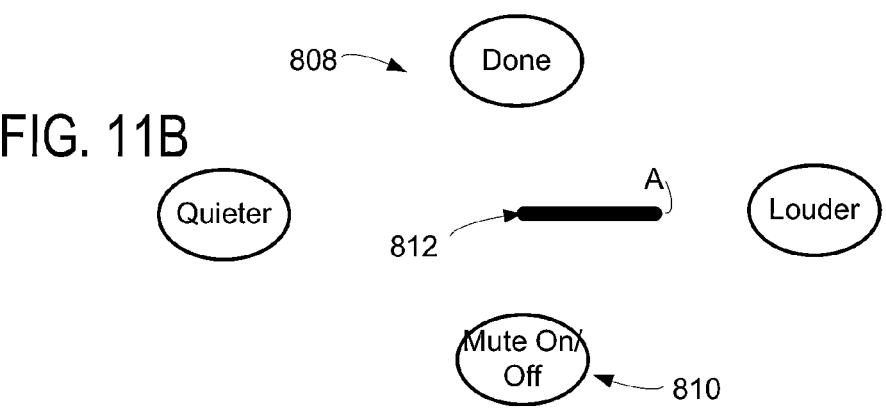
Figure 11C:
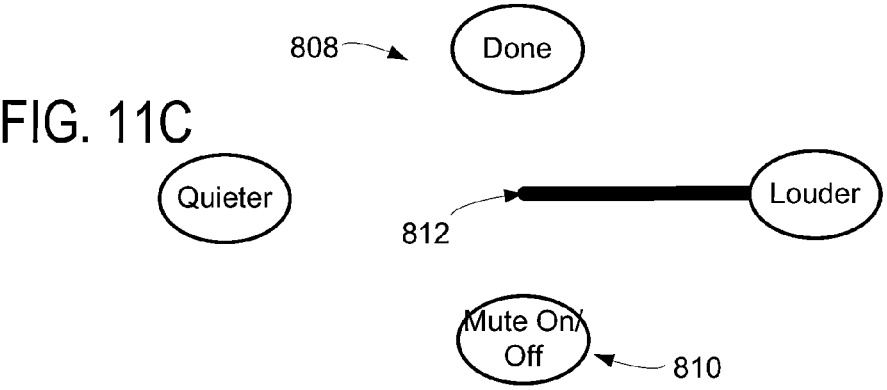

FIGS. 11A-11C show an example of a spoke 812 being progressively filled. This may be in response to the user moving their head further away from the hub 816 in a direction towards the menu item labeled "louder." For example, as the user rotates their head such that a vector that "shoots straight out" from between their eyes moves from the hub 816 to the right towards the "louder" menu item, the spoke 812 is progressively filled. Progressively filling the spoke 812 means to progressively or gradually present more of the spoke 812 in the HMD 2, in one embodiment. Progressively filling the spoke 812 means to progressively or gradually "fill in" the spoke 812 by, for example, making it more saturated, brighter, filled in, etc., in one embodiment. For example, the entire spoke 812 may initially be faded out. Then, progressively or gradually more of the spoke 812 is made brighter, filled in, saturated, etc. Note that spokes 812 can be "unfilled," as well, depending on the focus of the user.

Note that the filling the spoke 812 could have different sensitivities with respect to the head movement. In other words, the degree to which the spoke 812 fills in response to a certain amount of head movement can be an adjustable parameter. What this implies is that the aforementioned vector from the user's head need not point exactly to where the spoke 812 has been filled. For example, in FIG. 11B the spoke 812 has been filled to point A. The vector from the user's head may or may not be pointed at point A. The vector could be pointing closer to the hub 816 or further from the hub 816 than point A. The sensitivity can help to prevent false positives while still making it easy for the user to provide input.

Some spokes 812 are filled in what may be referred to as a "growth model". In this case, when the system 100 has determined in step 1006 that the user has moved their head a certain amount the spoke 812 begins to fill. The spoke 812 can continue to fill so long as the user maintains their head position outside of the "safe zone" near the central hub 816. This assumes the head position is also generally along the region of the spoke 812. Thus, even with the user's head not moving, the spoke 812 can continue to progressively fill as depicted in the sequence from FIG. 11A-11C.

Returning again to the discussion on FIG. 10, in step 1010, the system 100 determines whether a selection criterion has been met. In one embodiment, the selection criterion is met by the head moving a certain amount. Thus, the system 100 determines whether the user's head position reaches a selection point. This selection point refers to a certain amount of movement (e.g., head rotation), in one embodiment. A selection point is one example of a selection criterion. When this selection criterion is met, the system selects the menu item in step 1012. Referring to FIG. 11C, the "louder" menu item 810 is selected when the user's head has moved (e.g., rotated) a defined amount. This amount could be such that the aforementioned head vector is pointing at the louder menu item 810, to the right of it, or to the left of it (but right of the hub).

Note that after the selection of the menu item 810, the spokes menu 808 could go away. For example, after selection of the "done" menu item 810 in FIG. 9B, the spokes menu 808 in FIG. 9B could go away. It is also possible for a different spokes menu to replace the existing one, which is referred to herein as "spawning" a spokes menu 808. For example, the menu item of FIG. 9B could be spawned upon selection of the volume menu item of FIG. 9A. Other techniques can be used to make a spokes menu 808 disappear, such as the user nodding their head.

The degree to which the user needs to move their head to make the selection (i.e., to achieve the selection criterion) can be an adjustable parameter. This sensitivity could depend on the configuration of the spoke menu 808. For example, some menu items 810 could be located further away from the hub 816 than others (where further away may be measured in terms of degrees of head rotation, as one example).

In one embodiment, the selection point is reached when the spoke 812 has filled to a certain degree. As one example, this can be when the spoke 812 reaches the menu item 810, as depicted in FIG. 11C. This selection technique might be used in connection to the "growth model" technique described above. However, it can also be used in connection with other techniques such as ones that progressively fill the spoke 812 as the user continues to further move (e.g., rotate) their head.

If the selection criterion is not met (step 1010=no), then control passes to step 1011. In step 1011, the system determines whether the user is still focused on the same spoke. If so, then control passes to step 1010 to determine whether the selection criterion is met. Note that while the user continues to focus on the same spoke it may gradually fill in more or may gradually "unfill," depending on the user's focus.

It is possible that the user begins to move their head along a spoke 812, but then changes their mind and returns their focus to the central hub 816 or to a different spoke 812. This is tested for in step 1014 in the event that the user is no longer focused on the same spoke (step 1011=no). One option is to return to step 1008 to highlight the spoke that the user is presently focused on (e.g., head is oriented towards). Another option stemming from step 1014 is to return to step 1004 upon determining that the user's head is oriented at the safe zone near the hub 816. This is represented by the "hub" condition of step 1014.

Still another possibility is to abort in step 1016 if it is determined that the user is no longer looking anywhere near the spoke menu 808. This is represented by the "away from spoke menu" condition of step 1014 passing control to step 1016.

During the process of FIG. 10, the system 100 may provide feedback to the user. This could be audio feedback as one example. This feedback could be provided in connection with a variety of events. For example, when the spoke 812 is being progressively filled, audio feedback could be provided to assist the user in knowing that progress is being made.

In the process of FIG. 10, the user is allowed to move their eyes without triggering a response from the system 100. This is because it is head tracking that is used in this technique. This allows the user to keep their head relatively still while moving their eyes to scan the different menu items 810 in the spokes menu 808. The user does not need to keep their head perfectly still if there is a "safe zone" or the like, as previously discussed.

Figure 12:
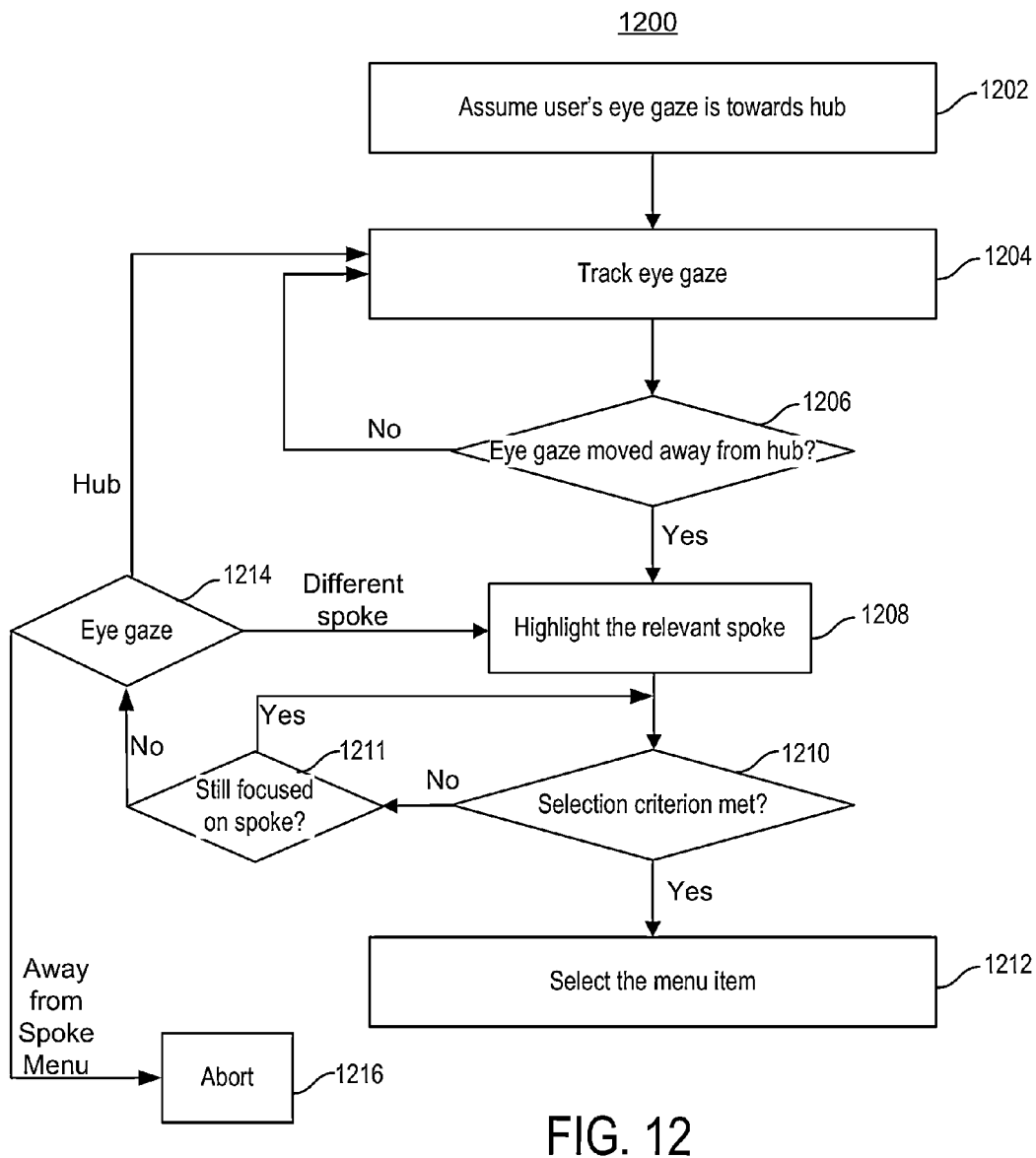
FIG. 12 is a flowchart of one embodiment of a process providing for a selection of a menu item on a spokes menu.

FIG. 12 is a flowchart of one embodiment of a process 1200 providing for a selection of a menu item 810 on a spokes menu 808. Process 1200 may be performed after step 714 from FIG. 7. Recall the step 714 results in a spokes menu 808 being activated, in one embodiment. For example, a spokes menu 808 such as depicted in FIG. 8D or 9A is activated. In process 1200, eye tracking is used.

At the beginning of process 1200, the system 100 may assume that the user's attention is focused on the hub 816 of the spokes menu 808. This is described in step 1202. This assumption may be made given that the hub 816 may be located at or near the end of the handle 806. As noted above, the hub 816, as well as the spokes 812 do not need to be presented in the HMD 2. Also, it is not necessary that the user is actually looking directly at the location of the hub 816.

Step 1204 is tracking the user's eye gaze. This has already been discussed. The eye tracking may be performed continuously throughout process 1200.

In process 1200 the system 100 may use a variety of techniques to prevent a false positive. In one embodiment, the system 100 allows the user to survey the spoke menu items 810 without making an inadvertent selection by requiring that the user provide a signal that they are now using their eyes for selection purposes. Thus, a condition for performing step 1206 is that a mode has been entered to analyze the eye gaze.

In step 1206, the system determines whether the user's eye gaze has shifted away from the hub 816. There may be some "safe zone" near the hub 816 such that the system does not consider this to be a significant eye movement unless the eye gaze moves some defined amount. The manner in which the eye movement is measured can vary.

If there is eye movement, then the system 100 highlights the relevant spoke 812 in step 1208. In one embodiment, only a portion of the spoke 812 is highlighted. This portion may be the portion that is closest to the hub 816. The amount by which the spoke 812 is progressively filled depends on how far the user has moved (e.g., rotated) their eyes, in one embodiment. The previously discussed examples of FIGS. 11A-11C are applicable to progressively filling the spoke based on the eye gaze. As with head movement, filling the spoke 812 could have different sensitivities with respect to the eye movement.

As with the example of head movement, some spokes 812 are filled in what may be referred to as a "growth model". In this case, when the system 100 has determined in step 1206 that the user has moved their eye a certain amount the spoke 812 begins to progressively fill. The spoke 812 can continue to progressively fill so long as the user maintains their eye position outside of the "safe zone" and near the spoke 812. Thus, even with the user's eyes are not moving, the spoke 812 can continue to progressively fill as depicted in the sequence from FIG. 11A-11C.

Returning again to the discussion on FIG. 12, in step 1210, the system 100 determines whether the selection has been triggered. In one embodiment, the selection point is triggered by the eyes moving a certain amount. In one embodiment, the system 100 determines whether the eyes "hover" near the menu item 810 (or other selection spot) for some defined time period. In one embodiment, the system 100 determines whether an additional select event occurs while the user's eye gaze is near the menu item 810 (or other selection spot). For example, the user could use a voice command to select, use a hand motion, touch a region of the HMD 2 (e.g., temple), etc. The foregoing are all examples of selection criterion that are based, at least in part, on eye gaze.

The degree to which the user needs to move their eye to make the selection can be an adjustable parameter. This sensitivity could depend on the configuration of the spoke menu 808.

In one embodiment, the selection point is reached when the spoke 812 has filled to a certain degree. As one example, this can be when the spoke 812 reaches the menu item 810, as depicted in FIG. 11C. This selection technique might be used in connection to the "growth model" technique described above. However, it can also be used in connection with other techniques such as ones that progressively fill the spoke 812 as the user continues to further move their eyes.

If the selection criterion is not met (step 1210=no), then control passes to step 1211. In step 1211, the system determines whether the user is still focused on the same spoke. If so, then control passes to step 1210 to determine whether the selection criterion is met. Note that while the user continues to focus on the same spoke it may gradually fill in more or may gradually "unfill," depending on the user's focus.

It is possible that the user begins to move their eye gaze along a spoke 812, but then changes their mind and returns their focus to the central hub 816 or to a different spoke 812. If the system determines that the user is no longer focused on the same spoke (step 1211=no), then control passes to step 1214 to determine an action to take based on eye gaze. One option is to return to step 1208 to highlight the spoke that the user has shifted their focus to (e.g., eye gaze is oriented towards).

Another option is to return to step 1204 upon determining that the user's eye gaze is oriented at the safe zone near the hub 816. Still another possibility is to abort in step 1216 if it is determined that the user is no longer looking anywhere near the spoke menu 808.

In the discussion of FIGS. 10 and 12, the spokes 812 are filled progressively. However, this is not an absolute requirement. In one embodiment, the spoke 812 fill all at once in response to the user's focus meeting some criterion, such as being focused near the menu item 810.

Figure 13:
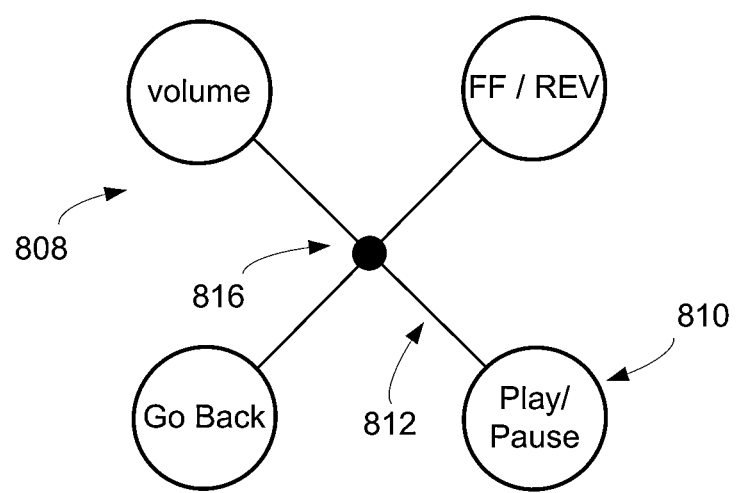
FIG. 13 shows one embodiment in which the menu items are at a diagonal from the hub.

A wide variety of configurations may be used for the spoke menu 808. FIG. 13 shows one embodiment in which the menu items 810 are at a diagonal from the hub 816. Again, the spokes 812 need not be presented in the HMD 2 at all times. As noted, a given spoke 812 can be progressively filled or grown in response to the user's focus. The hub 816 might never be displayed.

Figure 14A:
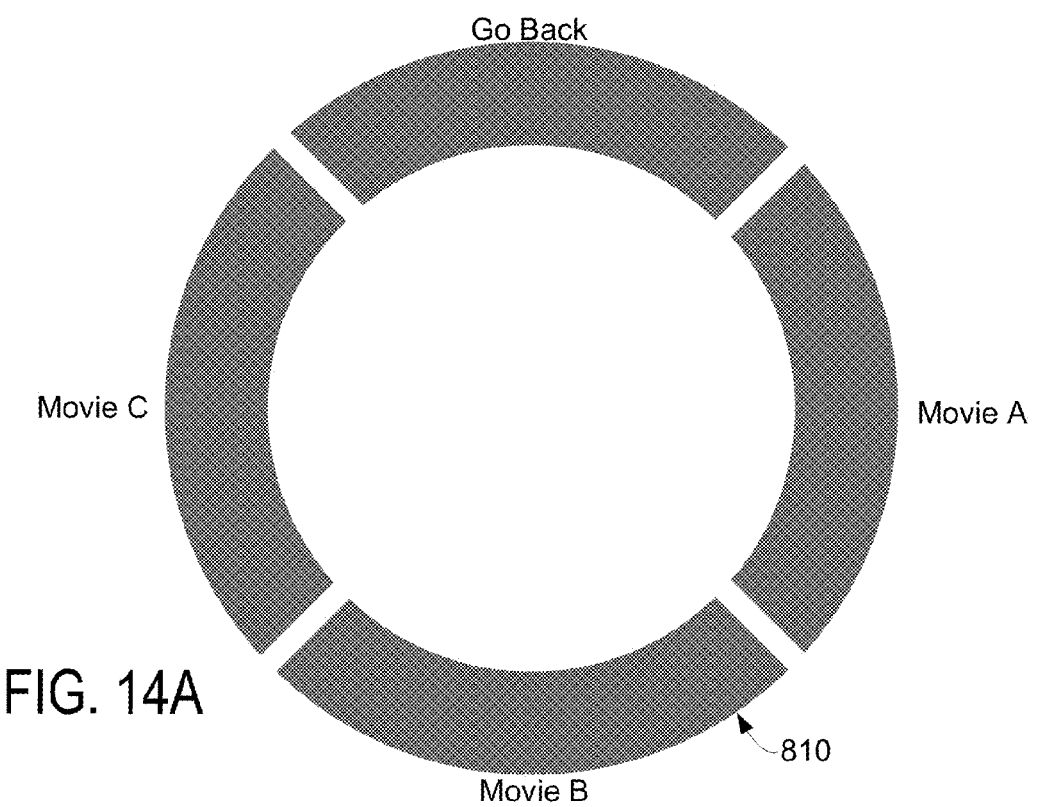
FIGS. 14A and 14B depict another embodiment of a spokes menu.
Figure 14B:
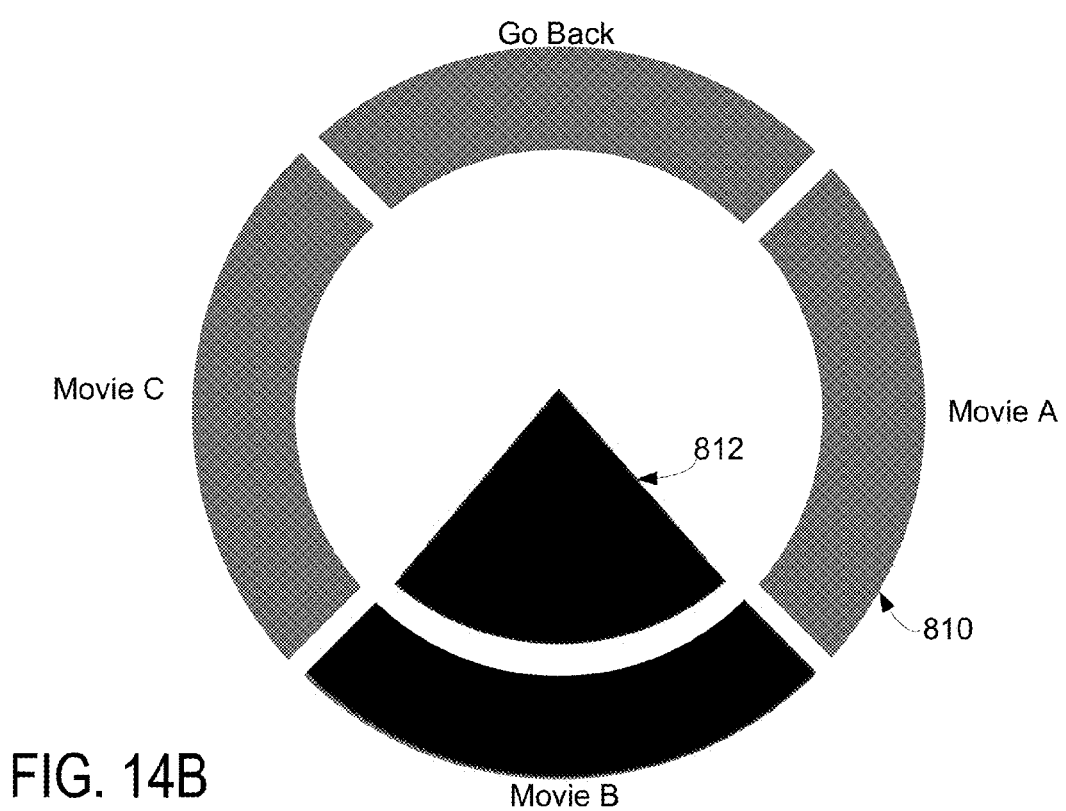

FIGS. 14A and 14B depict another embodiment of a spokes menu 808. FIG. 14A shows four menu items 810 in a radial configuration. The hub is in the center of the menu, although it is not depicted in FIG. 14A. The spokes are also not depicted in FIG. 14A. Three of the menu items 810 allow the user to select a movie, the other is for going back one menu.

FIG. 14B show this embodiment when one spoke 812 that has been filled (at least partially) in response to the system 100 determining that the user's focus has shifted from the hub towards the menu item 810 for Movie B. For example, the system 100 determined that the user's head rotated downwards some pre-defined amount. As with the discussion of FIG. 10, there can be a safe zone around the central hub to allow some movement prior to beginning to fill the spoke 812. The spoke 812 can fill progressively or fill all at once. The spoke 812 could also unfill progressively or all at once, depending on the user's focus. Other techniques discussed in connection with FIG. 10 or 12 can be used. In this example, the spoke 812 is pie-shaped. Many other shapes can be used for the spoke 812.

Figure 15:
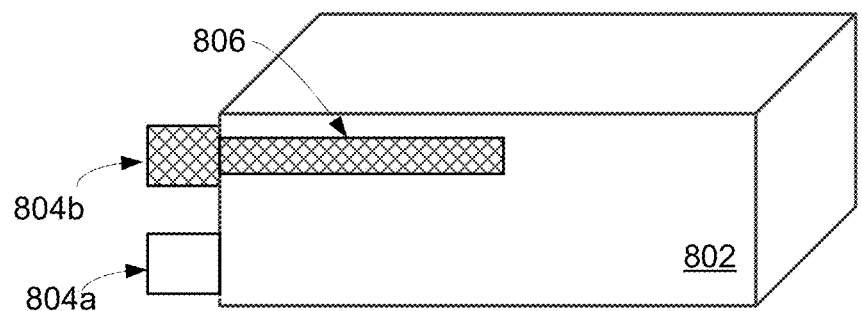
FIG. 15 shows an example in which there is a first user selection symbol and a second user selection symbol associated with object.

There can be more than one user selection symbol 804 associated with an object 802. FIG. 15 shows an example in which there is a first user selection symbol 804a and a second user selection symbol 804b associated with object 802. Second user selection symbol 804b has a handle 806 extended from it in response to the user focusing their attention at or near it. As discussed above, if the user focuses their attention away from the second user selection symbol 804b, along the handle 806, this will activate some menu element associated with the object 802. The user can also select the first user selection symbol 804a by focusing their attention on it.

In one embodiment, the system 100 presents both symbols 804a, 804b on the object 802 in response to the user looking in the general direction of object 802. The system 100 highlights symbol 804a in response to the user looking at that symbol 804a, and highlights symbol 804b in response to the user looking at that symbol 804b. As discussed previously focus can be determined by head tracking and/or eye tracking.

Figure 16:
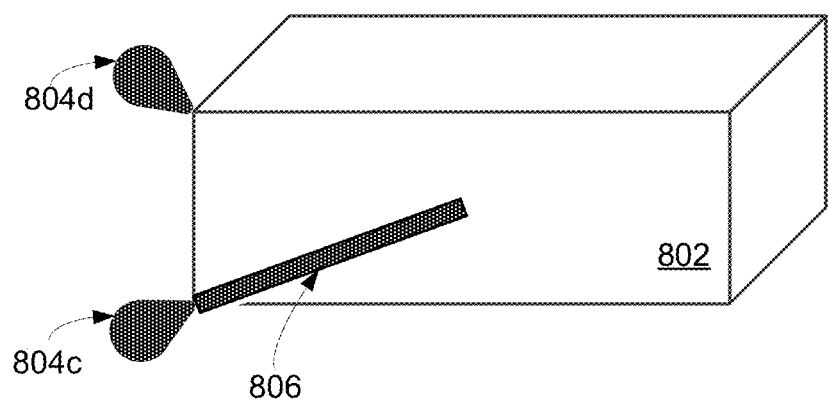
FIG. 16 depicts one embodiment in which user selection symbol points in the direction in which the handle has been extended.

In one embodiment, the user selection symbol 804 is shaped in a manner that identifies the direction in which the handle 806 will extend. FIG. 16 depicts one embodiment in which user selection symbol 804c points in the direction in which the handle 806 has been extended. User selection symbol 804d also points in a particular direction to indicate the direction in which the handle 806 will extend from it in response to the user focusing on that symbol 804d.

In one embodiment, there is feedback on the symbol 804 that indicates where the user's eyes or head vector is with respect to the symbol 804. For example, the symbol 804 looks like a comet having stardust that is magnetically drawn to where the user's eyes are focused. This helps the user know where they are focused when the symbol 804 is very small. It also helps when the system is using an invisible cursor. For example, this can assist the user by providing feedback of whether they need to shift their focus a little right or a little up/down/left in order to activate the user interface.

Figure 17:
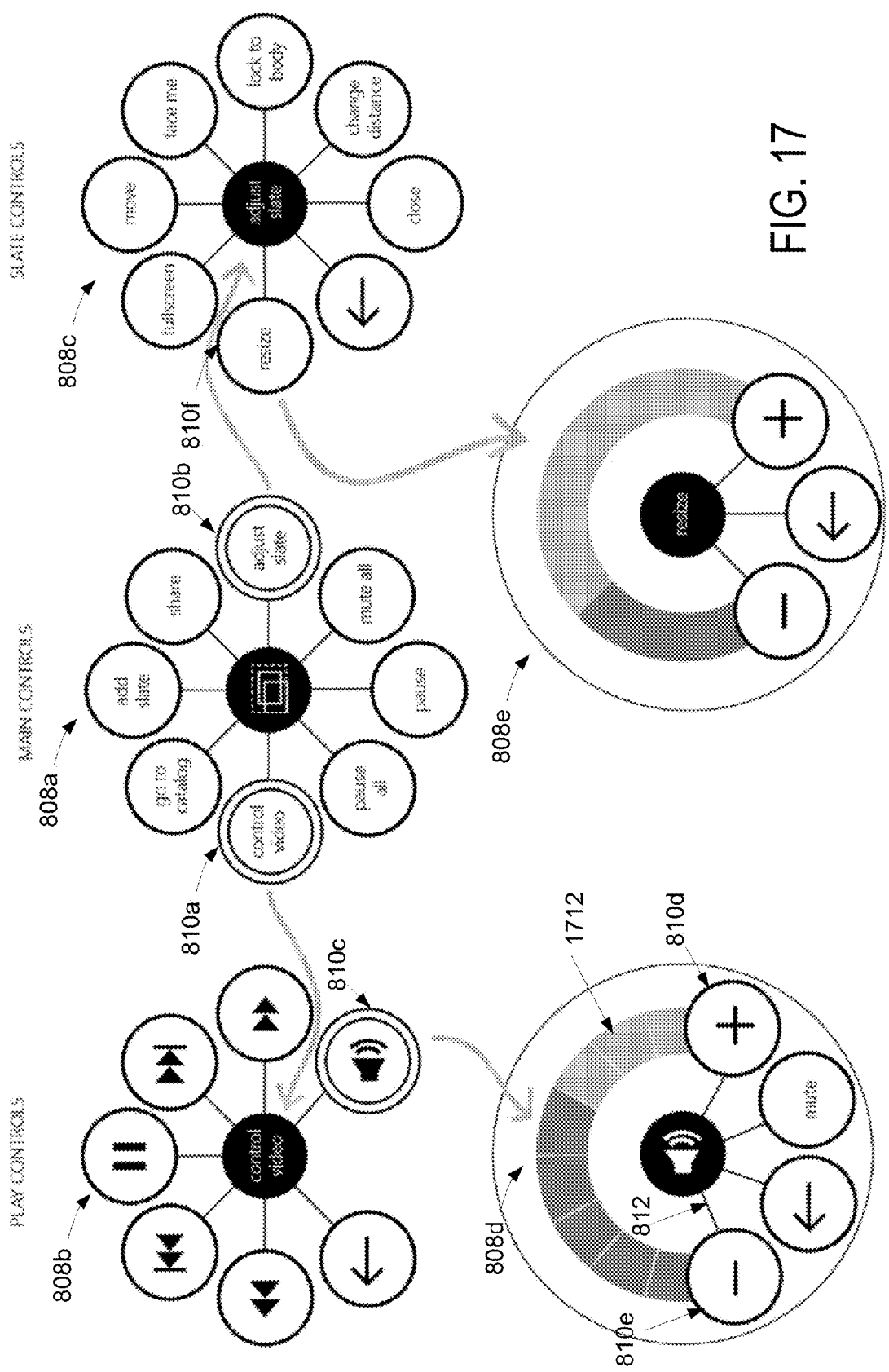
FIG. 17 shows one example of nested spoke menus.

In one embodiment, spoke menus 808 can be nested. This means that selection of a menu item 810 can spawn another spoke menu 808. FIG. 17 shows one example of nested spoke menus 808. In this example, there is a main control spoke menu 808a. Selection of the control video menu item 810a, spawns the play controls spoke menu 808b. Selection of the adjust slate menu item 810b, spawns the slate controls spoke menu 808c. Note that typically only one of these spoke menus 808 needs to be presented at a time. Thus, upon selection of the video menu item 810a, the main controls spokes menu 808a may disappear. In a similar manner, upon selection of the adjust slate menu item 810a, the main controls spokes menu 808a may disappear Going further down, selection of the volume menu item 810c in the play controls spoke menu 808b spawns the volume control spoke menu 808d. The volume control spoke menu 808d shows another way to provide feedback to the user. In one embodiment, the user focuses on either the decrease volume menu item 810e or the increase volume menu item 810d to change the volume. In one embodiment, the user focuses their attention along the spoke associated with a menu item 810 to provide input. For example, the user can control the volume by shifting their focus along the spoke 812 associated with the volume menu item 810e. The volume might be controlled by the position of the user's focus along the spoke. For example, the closer to the volume menu item 810e, the louder the volume is. Alternatively, the speed at which the volume changes might be controlled by the location of the user's focus along the spoke associated with the volume spoke menu item 810e. For example, the volume can increase more rapidly when the user's focus is near the increase volume menu item 810d. The volume bar 1712 provides feedback to the user. Similar control over user input may be provided by spokes associated with other menu items 810.

The foregoing indicates that there may be two (or more) types of spokes 812. One type of spoke 812 may be referred to as a "selection spoke." A selection spoke may result in a selection associated with the menu item. For example, the selection could spawn another spokes menu, or be an input (e.g., select play, select fast forward, etc.). Another type of spoke 812 may be referred to as an "amplitude" spoke. The amplitude spoke may allow the user to change a value, as one example. For example, the user can change a volume level, change the rate of fast forward, etc.

Also depicted in FIG. 17 is a resize menu item 810f in the slate controls 808c, which can spawn the resize spokes menu 808e, upon its selection.

Figure 18:
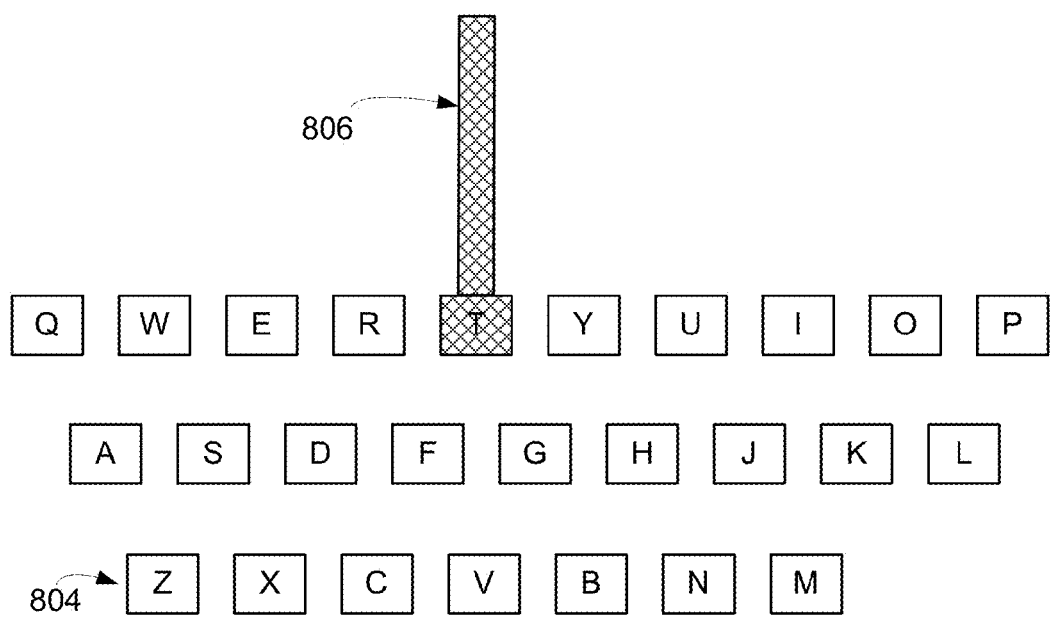
FIG. 18 shows one embodiment that allows user input based on focusing on the handle.

As noted in the discussion of FIG. 7, one possibility of step 714 is for input to be provided by the user shifting their focus to the end of the handle 806. One example of this is to enter letters on a keyboard. FIG. 18 shows one embodiment that allows user input based on sliding focus along the handle 806. FIG. 18 shows a number of user interface symbols 804, each of which is associated with a different letter of the English alphabet. These symbols 804 are presented to the user as virtual images in the HMD 2. There could be some object 802 associated with the symbols 804, although that object is not depicted in FIG. 18.

When a user looks at one of the symbols 804, the system 110 highlights that symbol 804 and grows the handle 806 out of the symbol 806. The user can then select that letter by shifting their focus from the symbol 804 to a point at or near the end of the handle 806 that is away from the symbol 804. Receiving the selection of the letter is one example of activating a user interface element in response to determining that the user's focus has shifted away from the user interface symbol 804 along the handle 806 to meet a selection criterion, in accordance with step 714 of FIG. 7.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method of providing a user interface, the method comprising:
    tracking head orientation of a user wearing a see-through, near-eye display device;
    determining a focus of the user based on the head orientation of the user;
    determining a location that is based on the user's head orientation when the user's focus meets a first selection criterion;
    spawning a spoke menu having a plurality of menu items in the see-through, near-eye display device in response to the user's focus meeting the first selection criterion, the plurality of menu items are displayed around the location that is based on the user's head orientation;
    progressively filling a spoke from the location towards a first menu item of the plurality of menu items in response to the user progressively moving their head orientation to indicate a shift in focus from the location towards a first menu item of the plurality of menu items; and
    activating the first menu item in response to determining that the user's focus has shifted from the location to along the spoke towards the first menu item to meet a second selection criterion.

2. The method of claim 1, further comprising:
    displaying a handle in the see-through, near-eye display device that extends away from a user interface symbol in response to determining that the user's focus is at the user interface symbol, wherein spawning the spoke menu is in response to the user's head orientation indicating the user's focus moves along the handle to the location to meet the first selection criterion.

3. The method of claim 1, each of the plurality of menu items has a spoke between the menu item and the location that is based on the user's head orientation when the user's focus meets the first selection criterion, further comprising:
    highlighting the spoke that is between the location and the first menu item in response to the user's head orientation indicating the user's focus shifts from the location towards the first menu item.

4. The method of claim 1, wherein the second selection criterion is based on the head orientation indicating the user's focus has reached the first menu item.

5. The method of claim 3, wherein highlighting the spoke comprises:
    continuing to progressively fill the spoke from the location towards the first menu item providing that the user's head orientation indicates the user's focus is outside of a safe zone near the location and generally along a region of the spoke.

6. The method of claim 5, wherein the second selection criterion is based on the spoke reaching the first menu item.

7. A display system comprising:
    a see-through, near-eye display device;
    logic in communication with the display device, wherein the logic is configured to:
        track head orientation of a user wearing the see-through, near-eye display device;
        determine a focus of the user based on the head orientation of the user;
        determine a location that is based on the user's head orientation when the user's focus meets a first selection criterion;
        spawn a spoke menu having a plurality of menu items in the see-through, near-eye display device in response to the user's focus meeting the first selection criterion, the plurality of menu items are displayed around the location that is based on the user's head orientation;
        progressively fill a spoke from the location towards a first menu item of the plurality of menu items in response to the user progressively moving their head position indicating the user's focus moves from the location towards the first menu item; and
        activate the first menu item in response to determining that the user's focus has shifted from the location to the spoke between the location and the first menu item to meet a second selection criterion.

8. The display system of claim 7, wherein the logic is further configured to:
    display a handle in the see-through, near-eye display device away from a user interface symbol in response to determining that the user's head orientations indicates the user's focus at the user interface symbol, the logic is configured to spawn the spoke menu in response to the user's head orientation indicating the user's focus moves along the handle to meet the first selection criterion.

9. The display system of claim 7, wherein the location that is based on the user's focus when the user's head orientation meets a first selection criterion is a central hub of the spoke menu, wherein each of the plurality of menu items is associated with a spoke between the menu item and the central hub, wherein the spoke associated with the first menu item is a first spoke, wherein the logic is further configured to:
    highlight the first spoke in response to the user's head orientation indicating the user's focus shifts from the central hub towards the first menu item.

10. The display system of claim 7, wherein the second selection criterion is based on the user head orientation indicating the user's focus has reached the first menu item.

11. The display system of claim 9, wherein logic is further configured to:
continue to progressively fill the first spoke from the central hub to the first menu item providing that the user's head orientation indicates the user's focus is outside of a safe zone near the central hub and generally along a region of the first spoke.

12. The display system of claim 11, wherein the second selection criterion is based on the first spoke reaching the first menu item.

13. A method of providing a user interface in a see-through, near-eye display device, the method comprising:
tracking a head orientation of a user wearing the see-through, near-eye display device;
determining a location that is based on the user's head orientation when the user's head orientation meets a first selection criterion;
spawning a spoke menu in the see-through, near-eye display device in response to determining that the user's head orientation meets the first selection criterion, wherein the spoke menu includes a plurality of menu items around a central hub at the location that is based on the user's head orientation when the first selection criterion was met, wherein each of the menu items has a spoke between the menu item and the central hub;
progressively presenting more of a first spoke of the spokes from the central hub towards a first menu item of the menu items providing that the user's head orientation indicates the user's focus is outside of a safe zone near the central hub and progressively moves along the first spoke towards the first menu item; and
activating the first menu item in response to determining that the user's focus based on the head orientation has shifted from the central hub to along the first spoke to meet a second selection criterion.

14. The method of claim 13, wherein the first menu item is activated in response to the spoke reaching the first menu item with the user's head orientation outside of the safe zone but not moving all of the way from the central hub to the first menu item.

15. The method of claim 13, wherein the first menu item is activated in response to the user changing their head orientation progressively along the spoke from the central hub towards the first menu item until the second selection criterion is met.

16. The method of claim 13, further comprising:
displaying a handle in the see-through, near-eye display device away from a user interface symbol in response to determining that the user's head is oriented at the user interface symbol, wherein spawning the spoke menu is in response to the user's head orientation moving along the handle to meet the first selection criterion.

17. The method of claim 13, further comprising:
highlighting the spoke in response to the user's head orientation shifting from the central hub towards the first menu item to indicate which of the spokes the user's head is orientated towards.

* * * * *